US009199742B2

(12) United States Patent
Giannakopoulos

(10) Patent No.: US 9,199,742 B2
(45) Date of Patent: Dec. 1, 2015

(54) AIRCRAFT PARACHUTE WITH BOWDEN CABLES ENERGIZED BY THE DYNAMIC SHOCK OF THE CANOPY

(71) Applicant: Pavlos Giannakopoulos, Patra (GR)

(72) Inventor: Pavlos Giannakopoulos, Patra (GR)

( * ) Notice: Subject to any disclaimer, the term of this patent is extended or adjusted under 35 U.S.C. 154(b) by 132 days.

(21) Appl. No.: 13/694,334

(22) Filed: Nov. 21, 2012

(65) Prior Publication Data

US 2013/0221159 A1 Aug. 29, 2013

(30) Foreign Application Priority Data

Jan. 26, 2012 (GR) .............................. 20120100055

(51) Int. Cl.
| B64D 17/00 | (2006.01) |
| B64D 17/24 | (2006.01) |
| B64C 13/30 | (2006.01) |
| B64C 25/30 | (2006.01) |
| B64D 17/36 | (2006.01) |
| B64D 17/80 | (2006.01) |
| B64D 25/04 | (2006.01) |
| B64D 37/26 | (2006.01) |

(52) U.S. Cl.
CPC ................ *B64D 17/24* (2013.01); *B64C 13/30* (2013.01); *B64C 25/30* (2013.01); *B64D 17/36* (2013.01); *B64D 17/80* (2013.01); *B64D 25/04* (2013.01); *B64D 37/26* (2013.01); *B64C 2201/185* (2013.01); *Y02T 50/44* (2013.01)

(58) Field of Classification Search
CPC ........ B64D 17/80; B64D 25/00; B64D 17/00; B64D 17/36; B64D 37/26; B64C 2201/185
USPC ...................................... 244/138 R, 139, 141
See application file for complete search history.

(56) References Cited

U.S. PATENT DOCUMENTS

| 2,433,952 | A | * | 1/1948 | Hines ............................ 244/139 |
| 2,478,758 | A | * | 8/1949 | Frieder et al. ................. 244/150 |
| 3,107,887 | A | * | 10/1963 | Dixon et al. .................. 244/139 |
| 3,129,913 | A | * | 4/1964 | Smith ........................... 244/139 |
| 3,463,425 | A | * | 8/1969 | Hibi ............................. 244/139 |
| 4,667,904 | A | * | 5/1987 | Herndon .................. 244/122 R |
| 6,224,019 | B1 | * | 5/2001 | Peterson et al. .......... 244/138 R |
| 7,487,939 | B1 | * | 2/2009 | Christof ........................ 244/139 |
| 8,056,861 | B2 | * | 11/2011 | Fleming, III ................. 244/139 |
| 8,100,365 | B2 | * | 1/2012 | Fleming, III ................. 244/139 |
| 2009/0050744 | A1 | * | 2/2009 | Christof ........................ 244/139 |
| 2010/0176244 | A1 | * | 7/2010 | Fleming, III ............. 244/135 R |
| 2010/0176246 | A1 | * | 7/2010 | Fleming, III ................. 244/139 |

\* cited by examiner

*Primary Examiner* — Philip J Bonzell
(74) *Attorney, Agent, or Firm* — Miltons IP/p.i.

(57) ABSTRACT

From the dynamic shock of the parachute canopy applied to an aircraft and unmanned aerial vehicle-(UAV) in an emergency, there is unlimited mechanical force available for exploitation through Bowden cables connected to the ends of the parachute straps, and transfer of the force in the form of a pull onto the emergency safety systems of the aircraft for the safety of passengers, and onto the aerial vehicle-(UAV).

10 Claims, 9 Drawing Sheets

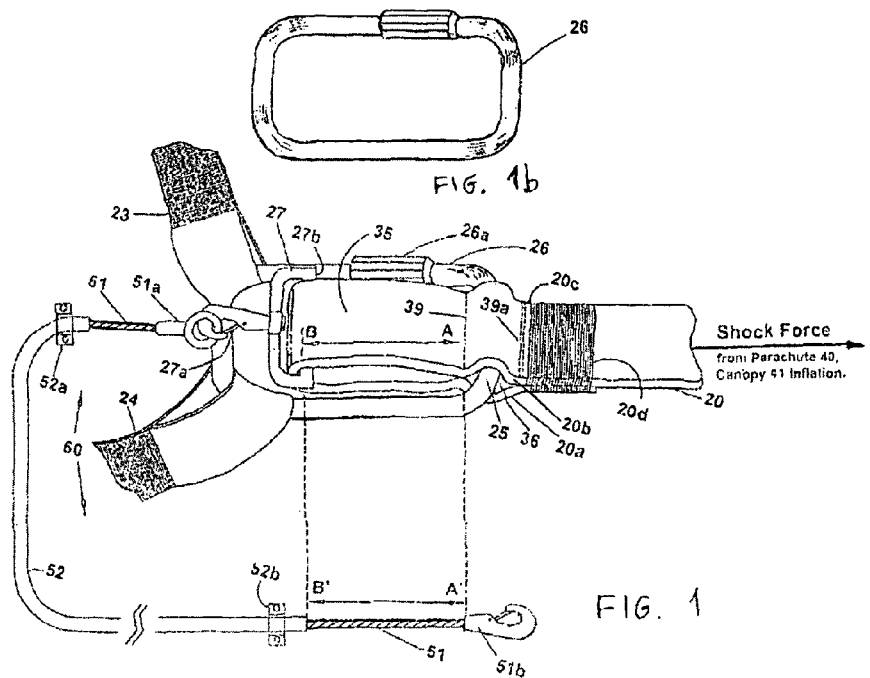
FIG. 1b
FIG. 1
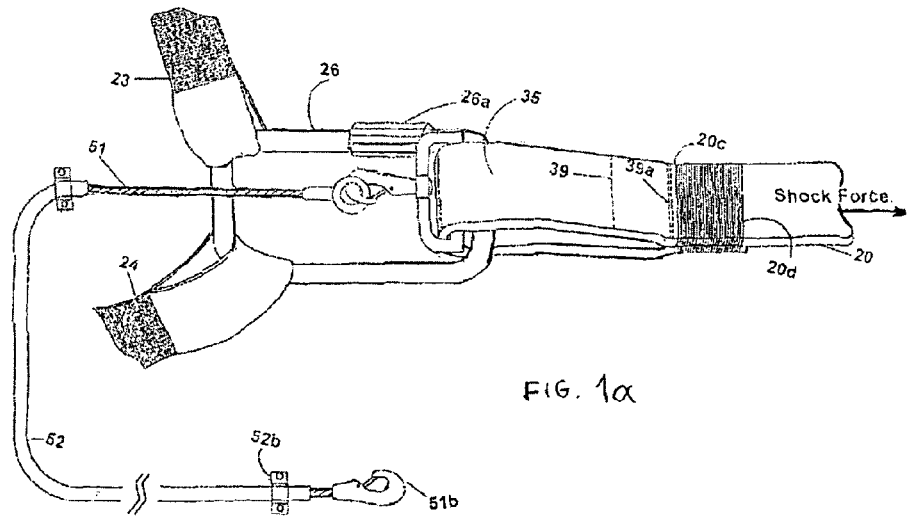
FIG. 1α

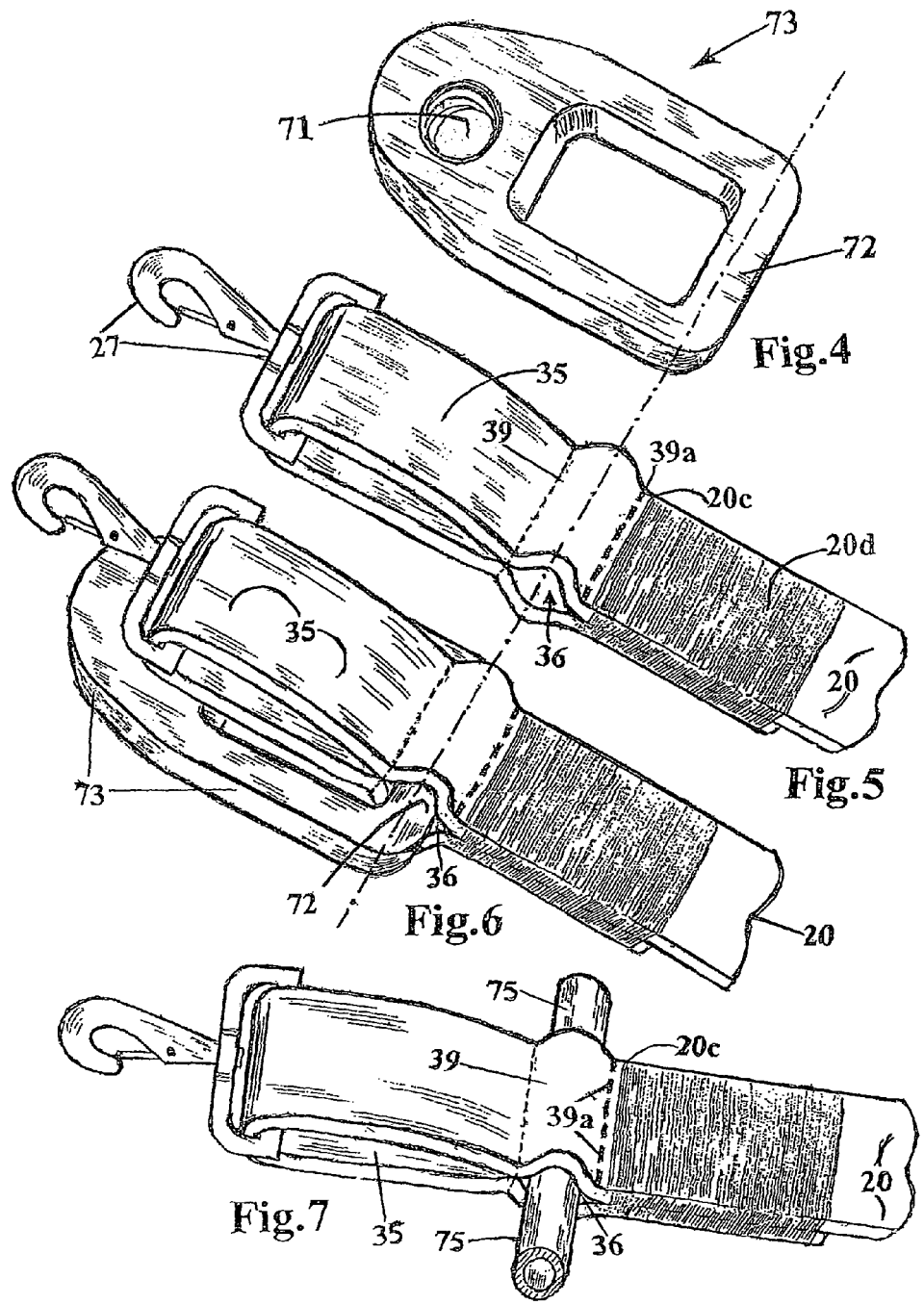

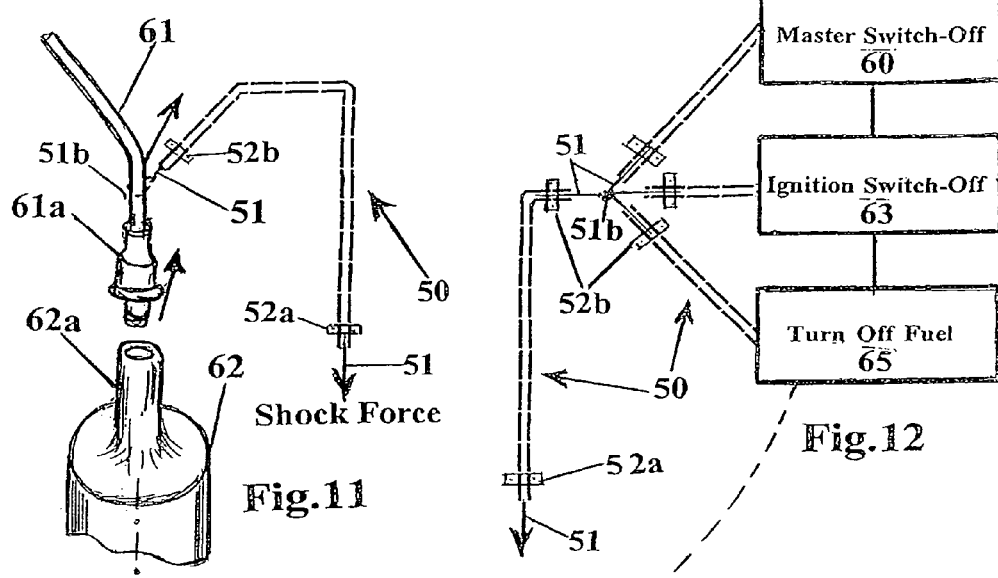
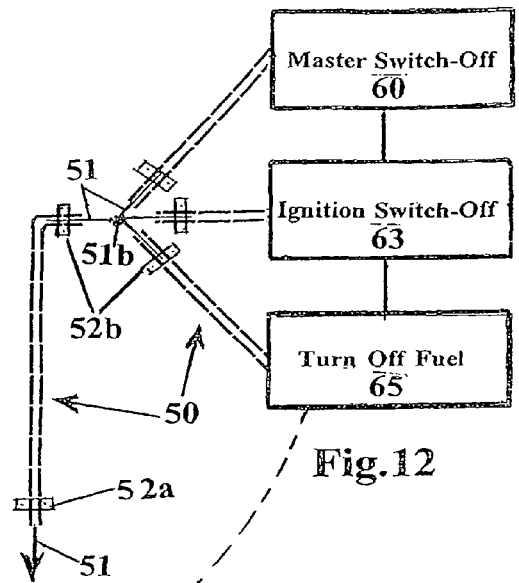
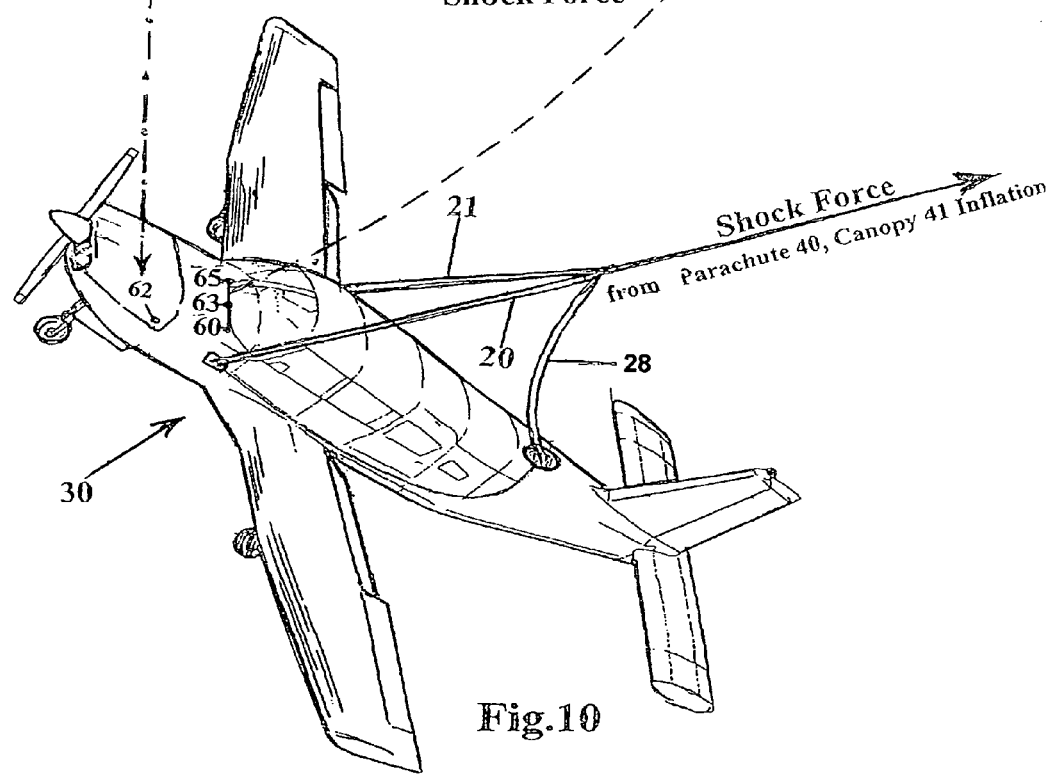

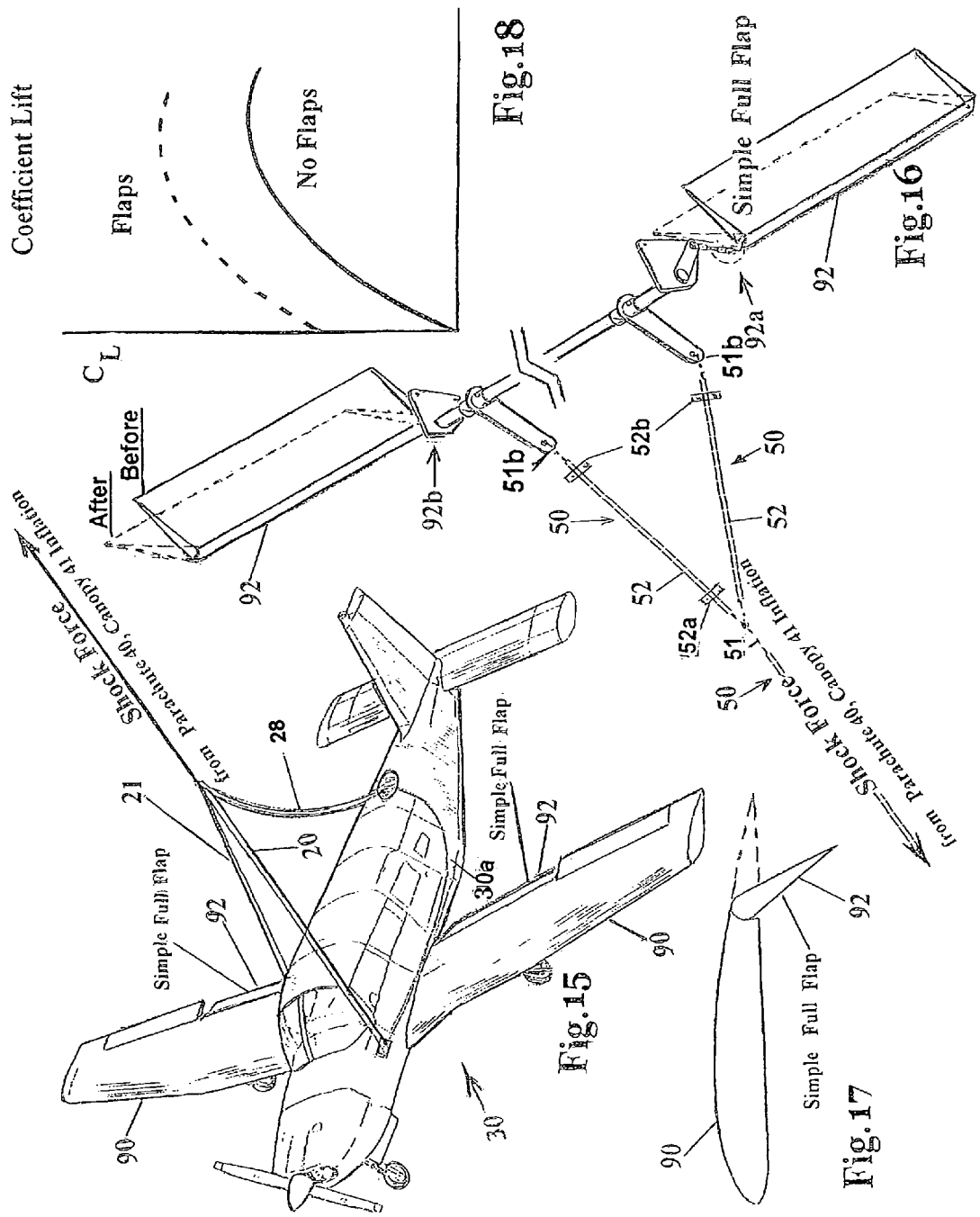

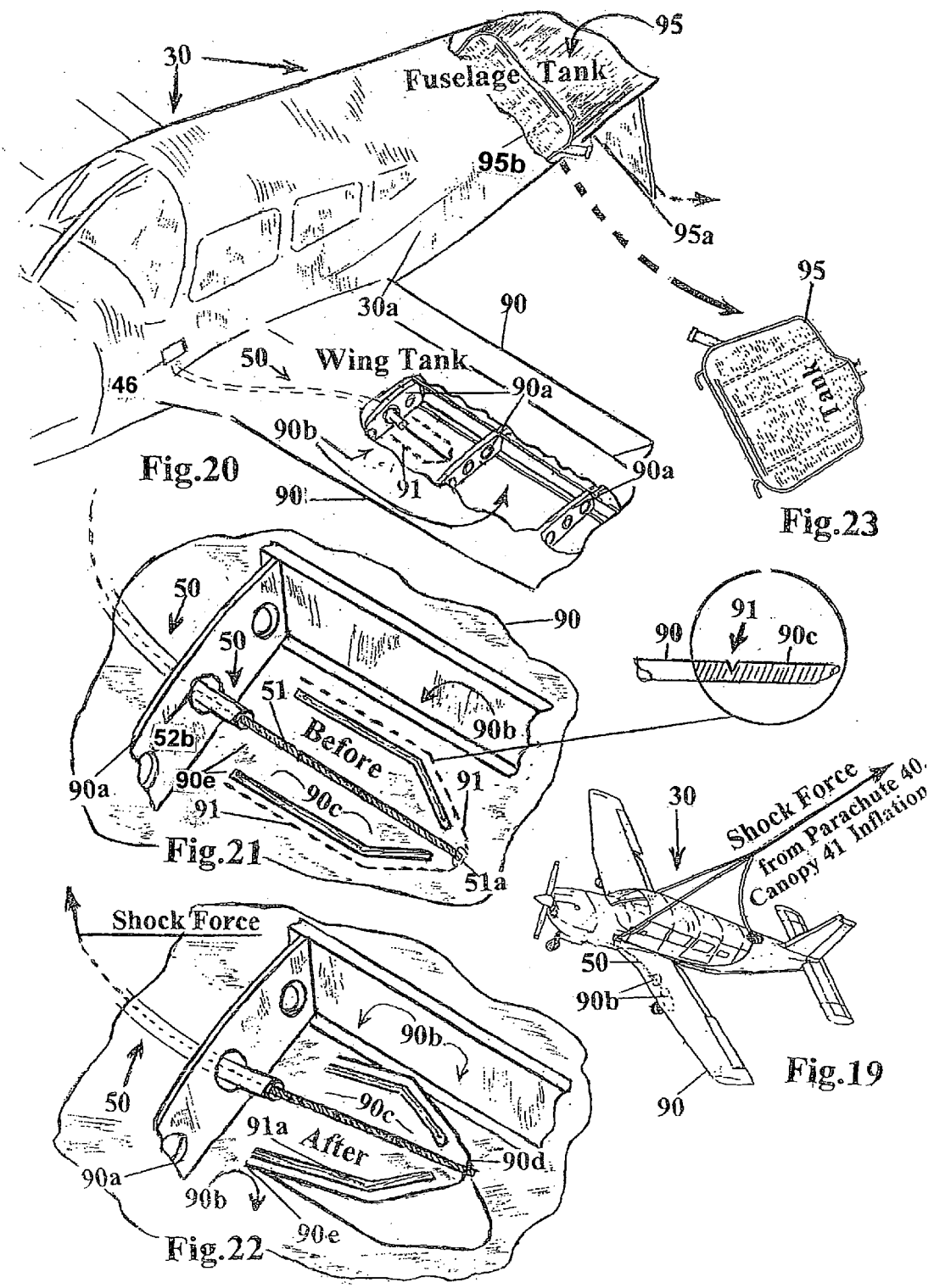

AIRCRAFT PARACHUTE WITH BOWDEN CABLES ENERGIZED BY THE DYNAMIC SHOCK OF THE CANOPY

FIELD OF THE ART

The present invention relates to the field of the art of ballistic parachute for emergency equipment on aircraft and unmanned aerial vehicle-(UAV), and more specifically it relates to the connecting loops formed by means of folding at the end of the parachute straps. Each loop is connected to the arm of a metal carabiner at the forward portion of the airframe towards the nose of the aircraft and aerial vehicle-(UAV), and is arranged so as to move linearly along the arm of the carabiner, during the stretching of the strap with the pulling of the loop by means of the energy resulting from the dynamic shock of the parachute canopy and for the exploitation of a fraction of the energy during the movement of the loop. Onto the loop, the steel inner cable of the flexible Bowden cable is connected, functioning as a mechanical pretension device cable for the reception during the small linear movement thereof together with the loop of a fraction of the energy derived from the dynamic shock for the transfer thereof in the form of a pull on the emergency systems of the aircraft for the safety of the passengers, and on the aerial vehicle-(UAV). Thus, unlimited mechanical force (no pyrotechnic mechanisms) is made available by the dynamic shock of the canopy for any safety system to take advantage of.

The mechanical force or energy created by the canopy (the surface resembling an open umbrella) of a ballistic parachute of an aircraft and aerial vehicle-(UAV), manifests as a dynamic shock. When the canopy of the parachute begins to inflate in the air as it is drawn and pulled horizontally behind the aircraft, or aerial vehicle-(UAV), during which stage the canopy of the parachute is still pear-shaped, the maximum force exerted on the canopy from the inflation, the reaction force, is presented as a dynamic shock.

The application of the present invention to the aircraft systems acts with the pull on the engine shutdown, (master switch-off), (ignition switch-off), (turn off fuel), and finally equips the safety belts with tightening and the seats with anti-submerging, thereby placing the passengers in a secure position during the deceleration of the aircraft without the assistance of pyrotechnic mechanisms, thus making them safe, it also acts on the extension of the landing gear system, and on the full flaps extension, drainage or drop of the liquid fuel tanks and, also relates to unmanned aerial vehicles-(UAV), during the descent in an emergency situation it acts with the pull on the engine shutdown, (master switch-off), (ignition switch-off), (turn off fuel), extension of the landing gear system, and full flaps extension, drainage or drop of the liquid fuel tanks.

In the previous technique, in an emergency situation for the aircraft and with the high G-force decelerations occurring during the dynamic shock when the forward straps of the parachute towards the nose of the aircraft initially tend to pull the nose of the aircraft and elevate it upwards, but also after the imminent dive of the aircraft resulting in the submerging and the forward ejection of the passengers' bodies from the aircraft seats leading to unpleasant conditions in the deceleration-acceleration environment. Moreover, in an emergency, the pilot must see to pulling the engine shutdown in very little time, but there are other actions the pilot must perform in the difficult period of an emergency such as extending the landing gear system, provided it has been retracted, etc. Both forward harness straps of the parachute are immovable and connected to fixed points onto the airframe in the forward portion towards the nose of the aircraft and aerial vehicle-(UAV) by means of firmly connected carabiners with screw lock, on both the left and right side thereof. The end of the straps is folded and immovable in the form of loops, at the points where they are connected to the carabiners. Furthermore, in the previous technique in an emergency situation for the aerial vehicle-(UAV), the pull on the engine shutdown must be performed in minimum time, however other actions are also required from the pilot to perform in the difficult time period during an emergency situation such as (master switch-off), (ignition switch-off), for (turn off fuel), etc.

With the application of the present invention to the linearly moving loops at the end of the forward straps of the-parachute connected to carabiners with screw lock towards the nose of the aircraft and aerial vehicle-(UAV), on both the left and right side thereof, the confinement of the existing carabiner arm is achieved transversely within the linearly moving loop at a formed opening. The carabiner is immovable and connected by means of pretension straps or other means to fixed points upon the airframe of the aircraft, and aerial vehicle-(UAV). Prior to their actuation, the linearly moving folded loops at the end of the straps are arranged so as to have little resistance for their small linear movement along the arm of the carabiner, during the stretching of the parachute straps by means of a remote pull caused by the energy resulting from the dynamic shock when the parachute canopy begins to inflate.

During the actuation of each loop of the forward straps towards the nose and left-right sides of the aircraft, and aerial vehicle-(UAV), the small linear movement of the loop is achieved by means of the powerful shock force exerted remotely, until it finally terminates with a fixed contact at the connection point upon the arm of the carabiner, whilst simultaneously a fraction of the force load is transmitted to the inner steel wire of the Bowden cable of the autonomous mechanical pretension device, connected to the loop. Thus, during the linear movement of the folded loop at the end of each forward parachute strap towards the nose of the aircraft and aerial vehicle-(UAV), the movement of the inner steel wire of the Bowden cable connected to the loop is achieved, and the reception of a fraction of the force load for exploitation with a definition of application finally to the systems of the aircraft and aerial vehicle-(UAV).

The moment the parachute canopy inflates, the initial result is for the folded ends in the form of loops at the end of the forward harness straps towards the nose of the aircraft and aerial vehicle-(UAV) to actuate with the linear movement thereof, caused by the dynamic shock, firstly by pulling linearly the Bowden cables of the pretension devices connected to the loops and then, when the linearly moving loops at the end of the straps terminate and with a strong contact onto the confined carabiner arm, they tend to slow down the movement of the aircraft and (UAV) by pulling the nose and elevating it upwards, however prior to the initiation of the deceleration the purpose of the present invention has already been achieved with the actuation of the Bowden cables of the pretension devices for a final application with a pull onto the various safety systems on the aircraft and (UAV).

With the Bowden cable equipment of the pretension devices connected at an appropriate point onto the loops at the end mainly of the forward straps of the parachute of the aircraft and (UAV), when the canopy of the parachute begins to inflate during the dynamic shock, the transmission of force loads is achieved by means of tightening the straps remotely and, the reception of loads by the pretension devices connected thereof and via the linear movement of the inner steel cables housed in the flexible housing of the Bowden cables, the delivery of the motion-force to various remote directions since the lower ends thereof are connected to various appropriate points of delivery of the motion-force for application to the aircraft systems such as safety belts, landing gear extension system, etc., and for application to the (UAV).

The extension of the landing gear system in a state of emergency for the aircraft and aerial vehicle-(UAV), provided it has been retracted, is intended to absorb the loads resulting from the collision with the ground by means of the wheel legs, the full flaps contribute to the decline in the rate of descent, whilst the drainage or drop of the liquid fuel tanks is intended to reduce the weight during the descent, avoid explosion because of fire in mid-air, and to avoid explosion during the collision with the ground.

The presently proposed autonomous pretension devices with Bowden cables may supplement the already existing systems of restraining in the safety belts for a further mild and yet firm tightening of the torso, since it has been observed that the conventional straps are sometimes insufficient in fully tightening and keeping the occupant of the seat in the right position during an emergency. The right initial position of the body presupposes supporting the torso, as well as the upper part of the body. The G-force developed during deceleration by the dynamic shock of the canopy of the ballistic parachute exerts an impulse on the bodies of the pilot and passengers, which tend to move freely forwardly and towards the floor of the aircraft or in a lateral direction, thereby leading to decreased consciousness of the situation, discomfort and a feeling of pain in the head and nape. This strain may result in unpleasant situations in a high deceleration environment.

For the rapid shutdown of the engine-propeller of the aircraft, in an emergency situation, it is appropriate to manually rotate the (master switch-off position), engine switch simultaneously or following the actuation of the manual handle for the launch of the parachute rocket, however there also exists the backup second movement performed by the pretension devices with Bowden cables with the transmission of the pull to the (master switch-off position), (ignition switch-off), (turn off fuel), and the pull to shut down the engine of the aircraft.

The application of the pretension devices with Bowden cables of the present invention to the safety belts and seats improves passive safety by providing protection of the passengers of the aircraft in an emergency situation during the high decelerations of G-forces, resulting from the dynamic shock and being from (3.5 G to 6.5 G), resulting in the submerging and ejection of the body from the aircraft seat and leading to unpleasant situations in a high deceleration environment, providing any desirable combination with the following:

1. Stretching of the parachute straps of the aircraft by means of a dynamic pull of the loops at the end of the straps and a simultaneous dynamic pull of the steel Bowden cables of the pretension devices connected thereto, intended to transmit the pull for the automatic tightening of the shoulder and waist straps of the safety belt and to secure and retain the passengers' bodies in a rectilinear position in a first stage of initiation of the tightening and release thereof in a second stage, following the landing.

2. Stretching of the parachute straps of the aircraft by means of a dynamic pull of the loops at the end of the straps and a simultaneous dynamic pull of the steel Bowden cables of the pretension devices connected thereto, intended to transmit the pull to the seats for anti-submerging with automatic elevation of the forward section of the seats and retention of the passengers' bodies in a first stage of initiation of the tightening and release thereof in a second stage, following the landing.

The application of pretension devices with Bowden cables of the present invention on the aircraft and aerial vehicle (UAV), is intended for an emergency situation during the stretching of the parachute straps by means of a dynamic pull of the loops at the end of the straps and a simultaneous dynamic pull of the steel Bowden cables of the pretension devices connected thereto, aimed at transmitting the pull separately with the cable for engine shutdown, with the (master switch-off) cable, with the (ignition switch-off) cable, with the (turn off fuel) cable, with the landing gear extension cable, with the full flaps extension cable, with the cable for the drainage of the liquid fuel tanks.

The two forward straps of the parachute, connected by means of carabiners onto the airframe of the aircraft and (UAV), can actually facilitate the transfer of loads a parachute may require from the dynamic shock in an emergency situation in mid-air and transfer small loads in the form of a pull to the safety systems of the aircraft, and UAV, through the pretension devices it is equipped with.

The abovementioned autonomous pretension device with Bowden Cable comprises a hollow and flexible outer cable of a complex construction, and a helicoidally twisted steel wire, usually incorporating a plastic jacket and a plastic outer housing and is mounted with the two ends of the exterior plastic housing onto a pair of corresponding fixed points of anchorage onto the airframe within the aircraft and is energized in an emergency by the dynamic shock of the canopy of the ballistic parachute for the pull on the safety belts, the bottom of the seat, and also acts on the aircraft and (UAV), for the mechanical engine shutdown, (master switch-off), (ignition switch-off), (turn off fuel), landing gear extension, and full flaps extension, drainage or drop of the liquid fuel tanks, and the outer plastic housing anchored to the two ends thereof serves as a channel or rail for the inner flexible cable made of steel or stainless steel (steel wire), or (any other material, as it is not only limited to that) to move freely between the two extreme fixed points of anchorage thereof with a view to exploiting during the dynamic shock a fraction of the mechanical energy transferred remotely via the movement of the inner flexible steel wire as the upper part thereof is connected at an appropriate point to the loop at the end of the parachute strap wherein the reception of motion-force is desirable, whilst the lower end thereof is connected to the airframe of the aircraft and (UAV), for the distribution of the motion-force via a hook splitter, which serves as a splitter for the extension of a respective number of connected pretension devices, with Bowden cables, with an application directly on the respective safety system of an aircraft, and (UAV).

The autonomous mechanical pretension devices with flexible Bowden cables for ease of operation thereof are preferably mounted onto the airframe within the aircraft and UAV, at the appropriate points, and the operation thereof is reliable as it has nothing to do with pyrotechnic mechanisms, but with mechanical operation.

The linear movement of the inner Bowden cable is usually employed with a scope of transmitting the force when one of the ends of the inner cable is being pulled towards its other end and when the remote transfer of force is required, between two fixed points of anchorage (as by way of example in bicycles wherein Bowden cables constitute the brake lever, the cable connecting individual elements of a machine, the clutch cable, such a cable is defined in English as a Bowden cable, however we may attribute certain individual properties to such a cable "X cable" or "X linkage" as the case may be)

wherein the force is eventually transferred in the form of a pulling action to the systems of restraining and safety of the seat, thereby functioning as a cable of mechanical control, capable of an alternate push-pull configuration, such that an impulse being exerted towards a certain direction produces a pulling action in an opposite direction at the other end thereof.

It is an objective of the present invention to make provision for the use of a fraction of the mechanical force load created by the canopy of the ballistic parachute by means of the dynamic shock and with the stretching of the parachute straps and the powerful force arriving remotely at the linearly moving loops at the end of the forward parachute straps and a fraction of the load from the powerful force is distributed firstly from the loops to the connected Bowden cables of the pretension devices, which transfer force with the linear movement thereof to the opposite end via a hook splitter, and then with the extension of numerous other pretension devices with a separate definition of application finally to the systems of the aircraft and aerial vehicle (UAV).

A further objective of the present invention is to offer an efficient pretension devices system with Bowden cables, appropriately configured in an aircraft seat with a connection to the seat belt by means of the cable, and with a connection to the seat bottom intended to transfer the pull for the provision of anti-submerging by automatically raising the forward section of the seat for the protection of the passengers' bodies from the exerted G-force of deceleration, during which they are free to move forwardly and slide underneath the strap of the waist safety belt, or even sideways.

A further objective of the present invention is the provision of a simple and reliable construction and mild operation of the interior steel Bowden cables of the proposed pretension devices, through which the mechanical force derived from the dynamic shock during the inflation of the canopy is transferred.

Another objective of the present invention is the distinctive application of pretension devices with Bowden cables, separately for pulling and retaining by means of the passenger safety belt cable for the tightening of the shoulder and waist straps and to a desirable different safety system during an emergency situation for the aircraft.

A final objective of the present invention is the selective replacement of the proposed inner steel wires of the Bowden cable configuration for certain safety systems with other kinds of non metal cables, such as composite structure cords, reinforced strings, nylon, etc.

The results of the present invention indicate the importance of the initial position preceding a landing and can assist so that the passengers are not in grave danger of suffering injury whilst it is performed.

BRIEF DESCRIPTION OF DRAWINGS

With reference to the accompanying drawings, we will hereinafter describe illustrative preferred embodiments of the invention.

(FIG. 1), presents in perspective view the preferred embodiment of the invention with the folded loop at the end of the parachute strap at the point where it is connected to the carabiner arm, prior to its action with linear movement capacity and confines the carabiner arm transversely within the opening formed between the two folded sides thereof, joined by means of transverse stitching, and with the pretension device with Bowden cable prior to its action connected to the metal snap hook upon the loop at the end of the strap, and the pretension device with Bowden cable bears the terminal stake eye at the upper portion, and the hook splitter at the lower portion for the extension of numerous connected terminal stake eyes of the pretension devices.

(FIG. 4), presents in perspective view the metal safety buckle as an alternative connection of the folded loop thereto.

(FIG. 5), presents in perspective view the folded loop at the end of the parachute strap of (FIG. 1).

(FIG. 6), presents in perspective view the folded loop of the previous (FIG. 5), in an alternative connection with the confined arm of the metal safety buckle of (FIG. 4), prior to its action with linear movement capacity.

(FIG. 7), presents in perspective view an alternative connection of the folded loop at the end of the parachute strap of (FIG. 5) connected to the confined tube of the airframe of the aircraft.

(FIG. 10), presents in perspective view the aircraft with a configuration of the appropriate electrical systems for the application of the pretension devices with Bowden cables.

(FIGS. 11, and 12), present in perspective view the way of action of the pretension devices with Bowden cables, connected to the master switch, ignition switch, fuel switch, and to the ignition cable of the aircraft's ignition coil for engine shut down.

(FIG. 15), presents in perspective view the aircraft with a configuration of the appropriate flaps systems with the application of the pretension devices with Bowden cables.

(FIG. 16), presents in perspective view the appropriate flaps with the application of the pretension devices with Bowden cables.

(FIG. 17), presents in side view the extended simple flap, of the previous (FIGS. 15, and 16).

(FIG. 18), presents in perspective view the elevation factor diagram with, and without, flap extension.

(FIG. 19), presents in perspective view a configuration of the appropriate wing tanks of the aircraft with the application of the pretension devices with Bowden cables.

(FIG. 20), presents in perspective view a configuration of the appropriate wing tanks of the aircraft, as well as the fuselage tank, with the application of the pretension devices with Bowden cables.

(FIG. 21), presents in perspective view a configuration of the wing tank of the previous (FIG. 20), prior to the action of the pretension device with Bowden cable.

(FIG. 22), presents in perspective view the wing tank of the previous (FIG. 21), following the action of the pretension device with Bowden cable.

(FIG. 23), presents in perspective view a configuration of (FIG. 20), with the fuselage tank during its extraction and drop.

DETAILED DESCRIPTION OF PREFERRED EMBODIMENTS

Figure 2:
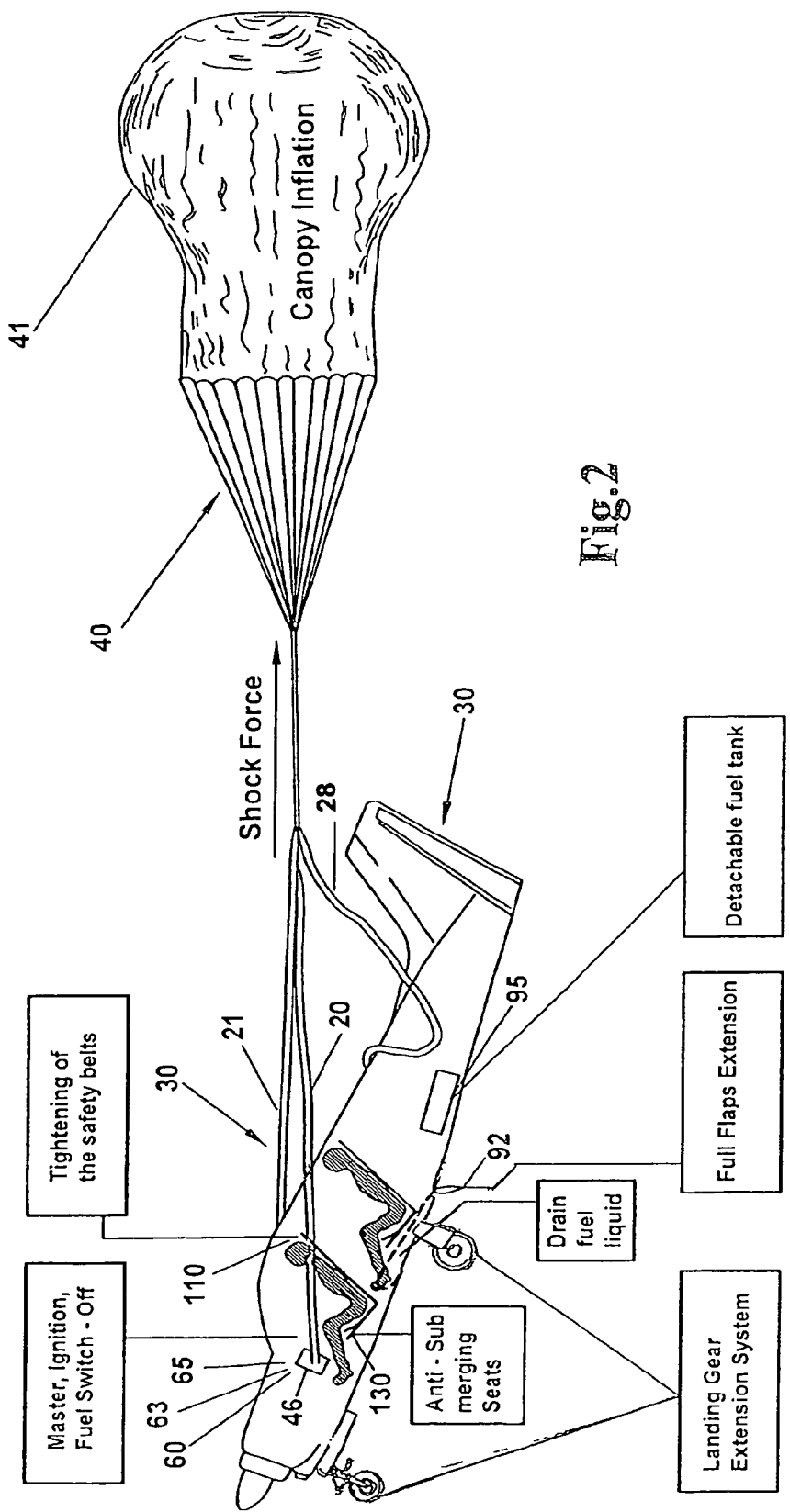
(FIG. 2), presents in perspective view the aircraft with the passengers thereof during the inflation and the action of the parachute canopy applied through the action of the pretension devices with Bowden cables on the appropriate systems of the aircraft, as well as the storage space of the loops of the straps with the pretension devices.

In the further description of the present invention, so as to facilitate understanding concerning the harness straps for the aircraft (30), and aerial vehicle (UAV) (70), (FIGS. 2, and 3), it is connected and retained by three parachute straps (40), with the main application of the invention preferably to the two forward straps (20), and (21), of the parachute (40), towards the nose of the aircraft (30), with a connection to the forward socket (46), on both the right and left thereof. The third strap (28), of parachute (40), is connected towards the tail of the aircraft (30), towards the storage space for the parachute (40).

The preferred embodiment of the present invention is presented in perspective view in (FIG. 1), with the end of the strap (20), of the parachute (40), in (FIGS. 2, and 3), folded in the form of a loop (35), at the point where it is connected to the arm (25), of the carabiner (26), prior to its action and transversely confines the arm (25), of the carabiner (26), within the opening (36), formed between the two folded sides (20a, and 20b), of the strap (20), and connected together at the confinement point of the arm (25), within the opening (36), by means of transverse stitching (39), and by means of transverse stitching (39a), so that by reason of the transversely confined arm (25), the loop (35) is retained fixed and immovable at the end of the strap (20), of the parachute (40), prior to its linear movement operation along (A-B), during the pull thereof in an emergency situation, through the stretching of the strap (20), caused by the dynamic shock of the canopy (41), of the parachute (40). As presented in (FIG. 1), the loop (35), of the strap (20), is connected to the metal snap hook (27), with a safety (27a). The metal snap hook (27), bears an arm (27b), wherein the folded loop (35) at the end of the strap (20) enters and penetrates through. The metal snap hook (27), (FIG. 1), with the arm (27b), is confined by means of a strong contact within the end (B), of the folded loop (35), at the end of the strap (20), of the parachute (40), for the connection of the terminal stake eye (51a) thereto, functioning as a connection terminal at the upper terminal end of the inner stainless steel wire cable (51), of the pretension device (50), with Bowden cable, prior to its action during the normal operation of the aircraft (30), and aerial vehicle-(UAV) (70).

The carabiner (26), (FIG. 1), bears mounting straps (23), and (24), which are firmly connected to the airframe of the aircraft (30), and UAV (70), and thus the carabiner (26), always remains immovable and connected to the airframe of the aircraft (30), and UAV (70). The carabiner (26), also bears screw lock (26a), for securing the incoming straps.

Figure 3:
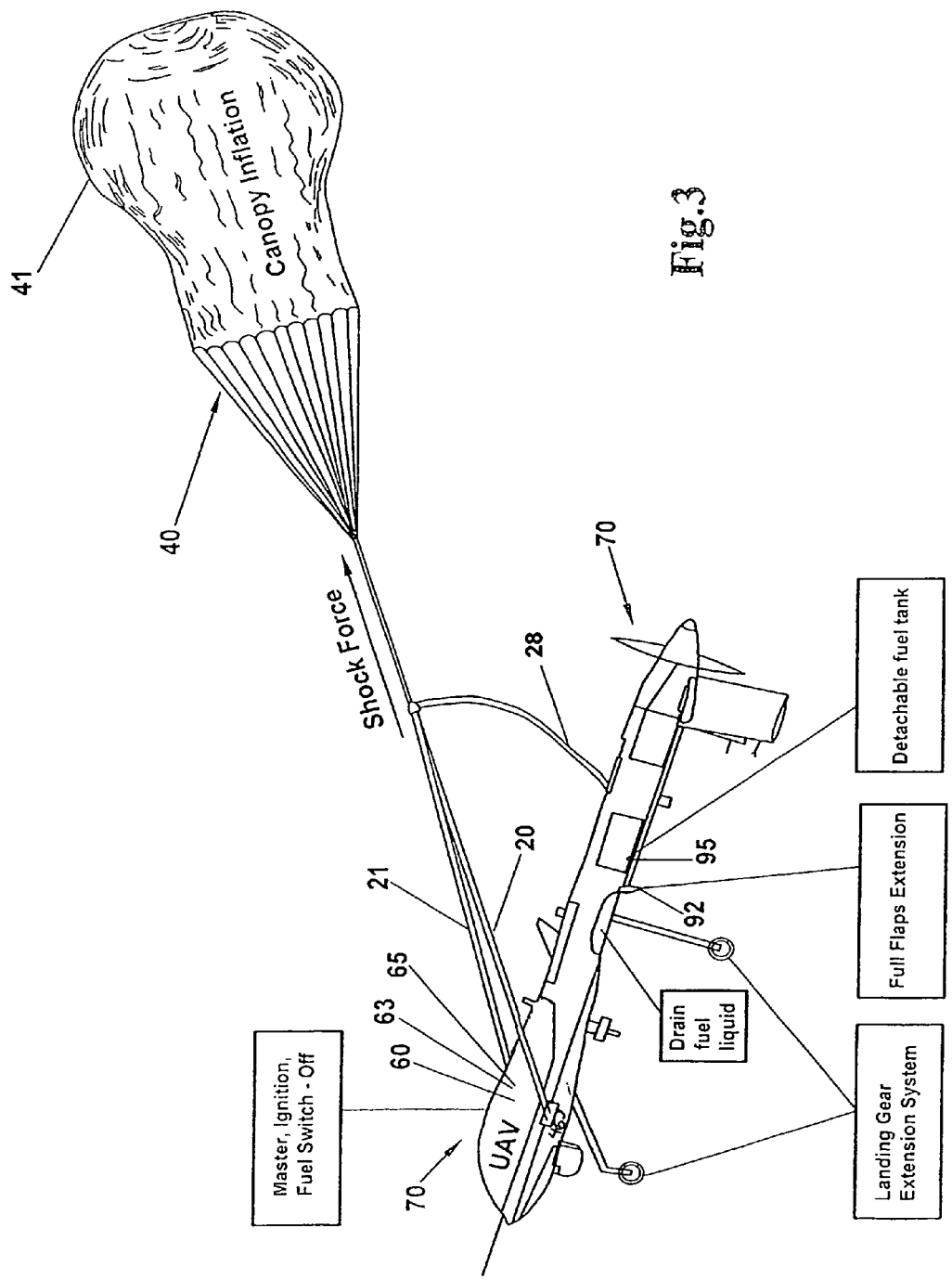
(FIG. 3), presents in perspective view the aerial vehicle-(UAV) in an emergency situation during the inflation and the action of the parachute canopy as well as the points where the stored loops of the end of the straps are connected to the pretension devices, and with the energy applied through the pretension devices to the indicated systems of the aerial vehicle.

The last end of the strap (20), after being folded so as to form the loop (35), is connected strongly by means of stitching (39a), at the points (20c), between the two folded sides thereof (20a), and (20b), which come into contact and are then covered with strong plastic (20d), material etc. The operation of the folded loop (35), prior to the operation thereof in an emergency situation in (FIG. 1), at the end of the strap (20), and as presented, the loop (35), is allowed a small linear movement along (A-B), by means of a pull thereof to the end (B), when the strap (20) suffers stretching caused by the dynamic shock of the canopy (41), of the parachute (40), (FIGS. 2, and 3), as it begins to inflate. The distance marked with the arrows (A-B) in (FIG. 1) of the folded loop (35), is equal to the effective linear movement length of the folded loop (35), and is also equal to the effective linear length (A'-B'), of provision and reception for the transmission of linear movement-remote force via the inner cable (51), made of stainless steel or galvanized steel or wire, rope or cable, etc. (FIG. 1) of the pretension device (50), with Bowden cable, and wherein the inner cable (51), is connected my means of the metal snap hook (27), onto the loop (35), at the end (B), of the strap (20), of the parachute (40), and with a final application to the systems of the aircraft (30), (FIG. 2), and with an additional final application to the systems of the aerial vehicle-(UAV) (70), (FIG. 3).

The first stage of operation with the pretension devices with Bowden cables of the aircraft (30), is presented in perspective view in (FIG. 1) in an emergency situation, when exploitation of the dynamic shock of the canopy (41), of the parachute (40) is performed, when the forward harness straps (20), and (21), of the parachute (40), during the dynamic shock suffer stretching caused by the canopy (41), of the parachute (40), and a reliable pull operation is performed with transmission of the movement-remote force to the inner cable (51), of the pretension device (50), with Bowden cable (FIG. 1), wherein the steel cable (51), is connected upon the loop (35), by means of the metal snap hook (27), with a safety (27a).

The moment the canopy (41), of the parachute (40), initially inflates during the dynamic shock in an emergency situation (FIGS. 2, and 3), the result is the stretching initially of the forward strap (20), and (21), of the aircraft (30), and aerial vehicle-(UAV) (70), performed remotely by the dynamic chock, thus the end of the strap (20), folded in the form of a loop (35), is pulled with linear movement so as to achieve the tear of the stitching (39), and the release of the loop (35), and then the linear movement thereof along the effective length (A-B) in (FIG. 1), of the folded loop (35), and during the movement thereof the reception of a fraction of the force load is performed via the inner steel cable (51), (FIG. 1), of the pretension device (50), with Bowden cable connected thereto which is equal to the provision of the remote transmission of motion-force equal to the effective linear length of the appropriate arrows (A'-B'), (FIG. 1), transferred to the movable inner steel cable (51), of the pretension device (50), with Bowden cable, and then it finally terminates with fixed contact at the connection point with the confined arm (25), of the fixedly connected carabiner (26), by means of mounting straps (23), and (24), onto the airframe of an aircraft (30), and aerial vehicle-(UAV) (70).

The pretension device (50), with Bowden cable (FIG. 1), with the inner cable (51), connected to the metal snap hook (27), upon the loop (35), has a final application to the systems of the aircraft (30), (FIG. 2), for the engine shutdown, (master switch-off), (ignition switch-off), (turn off fuel), equips the safety belts with tightening and the seats with anti-submerging thereby keeping passengers in a secure position during the deceleration of the aircraft without the intervention of pyrotechnic mechanisms thus rendering them safe, acts on the extension of the landing gear system and full flaps, drainage of the liquid fuel tanks, as well as at other points of the fuselage, etc., and with an application to the unmanned aerial vehicle-(UAV) (70), (FIG. 3), during its descent in an emergency situation to shut down the engine, master switch-off, ignition switch-off, turn off fuel, extension of the landing gear system, full flaps extension, drainage of the liquid fuel tanks.

Following the first stage of operation wherein the purpose of the present invention has already been achieved in an emergency situation when exploitation of the dynamic shock of the canopy (41), of the parachute (40), is performed the second stage of operation follows rapidly when the loops of the forward straps (20), and (21), of the parachute (40), finally terminate with fixed contact and connection to the respective confined arm (25), of the respective carabiner (26), connected indirectly to the airframe of the aircraft (30), by means of mounting straps (23), (24), resulting in the forwards straps (20), and (21), of the parachute (40), towards the nose of the aircraft tending during the dynamic shock to pull at first and draw the nose of the aircraft and elevate it upwards, but the application of the invention has been achieved, and then with the imminent dive of the aircraft with the high decelerations-accelerations of the developing G-forces the passengers are safe whilst equipped with tightening in their safety belts and with anti-submerging in the seats, but also in the other systems of the aircraft (30), and aerial vehicle-(UAV) (70).

The abovementioned operation of the folded loop (35), (FIG. 1), and more specifically the connection thereof to the carabiner (26), is indicative as there are alternative connections of the loop (35), in (FIG. 5), such as to the arm (72), of a metal safety buckle (73), (FIG. 4), which is fixedly connected by means of a screw via the opening (71), at a fixed point directly onto the airframe of the aircraft (30), wherein (FIG. 5) the folded loop (35), is depicted with the opening (36), whilst in (FIG. 6), it is depicted with the opening (36), with the accommodation and confinement within the arm (72), of the metal safety buckle (73), or without a hook (FIG. 7) wherein the folded loop (35), at the end of the strap (20), is connected fixedly prior to its action thus confining within the opening (36), the tube (75), of the airframe of the aircraft (30), but the linear movement operation of the loop (35), at the end of the strap (20), of the parachute (40), which is connected by means of the arm (72), to the safety buckle (73), and to the tube (75), of the aircraft (30), remains the same as initially described above.

The pretension device (50), with Bowden cable (FIG. 1), functions as a device representing the anchorage thereof to a minimum of two points (52*a*), and (52*b*), or more points of anchorage thereof for the provision of a pull on a safety system, however this way of connection is true and representative of the basic pull function to all safety systems of the aircraft (30), and aerial vehicle (70).

The basic mechanical structure of the cables (wire ropes) comprises a bundle of two or more co-twisted wires. The structure is usually referred to as (1×) the number of wires or ropes or cables being engaged, that is to say, (1×7) (7 WIRES) or (1×19) (19 WIRES), etc.

This is the leg of the basic structure, used in different combinations to construct a different version using other cables. This kind of structure has applications in cars, instruments, aviation, etc., and the structure has various properties, designed for special applications.

The proposed pretension device (50), with Bowden cable system (FIG. 1), bears the inner wire cable (51), made of stainless steel wherein at the upper terminal end thereof bears the terminal stake eye (51*a*), whilst at the lower extreme thereof it bears a hook splitter (51*b*), which serves as a splitter for the connection and extension of numerous other connected terminal stake eyes (51*a*), of the pretension devices (50), with Bowden cables connected thereto so as to pull and fasten the respective systems of an aircraft (30), and aerial vehicle-(UAV) (70).

For every section of the pretension device (50), with Bowden cable there are a minimum of two fixed anchorage points (52*a*), and (52*b*), (FIG. 1), within the aircraft for the linear, longitudinal movement of the inner wire cable (51) for distances, particularly around corners. The pretension device (50), with Bowden cable comprises an inner wire (51), made of stainless or galvanized steel, or other appropriate material, encased within the helical outer housing of concentric configuration made of wire cable (52), and plastic as depicted in (FIG. 1), and is used for the transmission of longitudinal movement and transfer of force to predefined distances, particularly around corners. The present invention concerns a proposal for the transmission of movement-transfer of force over a curve route as presented in (FIG. 1,8,9,11,12,13,16, 20), with the use of a flexible Bowden cable. More specifically, the present invention concerns such an autonomous, remote system of transmission-control of force exploiting a fraction of the energy resulting from the suddenly applied force during the pull caused by the dynamic shock.

The rail (52) comprises an outer helicoidally twisted wire cable and a plastic jacket, ensuring the operation of the pretension device (50), with Bowden cable wherein automatically, with a pull on the upper terminal end via the terminal stake eye (51*a*), of the inner steel cable (51), the mechanical force is transferred to the lower terminal end, the hook splitter (51*b*), wherein the delivery of force is desirable via the rail (52), of the pretension device (50), with Bowden cable.

The inner cable (51), made of stainless or galvanized steel or wire, rope or cable, etc. (FIG. 1), is an integrated helicoidal configuration of concentric wires for a variety of operation conditions. This construction has various properties and is designed for special applications.

The complete Bowden cable set, of the pretension device (50), comprising the inner cable (51), made of stainless steel, is used to transmit by means of the terminal stake eye (51*a*), as presented in (FIG. 1), the suddenly exerted pulling force of the inner cable (51), made of stainless steel when the remote transfer of force is required (as by way of example in bicycles with the Bowden cables of their brakes). Concerning the present invention, the Bowden cables transmit via the inner cable (51), the pull to all retaining and safety systems of the aircraft (30), such as seats etc., and separately to each one, thus operating as cables of mechanical control, with an alternate push-pull configuration operation, so that when the push is performed towards a certain direction, at the other end via the hook splitter (51*b*), a pull is performed towards the opposite direction.

The pretension device (50), with Bowden cable is connected between a minimum of two fixed points of mounting-anchorage, with anchorage by means of clamps of the outer plastic housing (52), wherein the case in point fixed points of mounting-anchorage (FIG. 1), are considered on the one hand the upper extreme clamp (52*a*), of the outer cable (52), of the pretension device (50), with Bowden cable. The upper extreme point (52*a*), of the rail (52), of a pretension device (50), with Bowden cable is firmly connected to the forward socket (46), on both the left and right within an aircraft (30), (FIG. 2, 3), to a fixed point of anchorage and immovable upon the airframe towards the nose of an aircraft (30), and at the nearest distance from the folded in the form of a loop (35), end (B), of the strap (20), (FIG. 1). Next, the upper terminal end of terminal stake eye (51*a*), of the inner wire cable (51*a*) made of steel, of the pretension device (50), with Bowden cable is connected (FIG. 1), by means of the metal hook (27), onto the loop (35), at the end (B), of the strap (20), of the parachute (40). The lower extreme clamp (52*b*), of the outer cable (52), of the pretension device (50), with Bowden cable is firmly connected and immovable at a fixed anchorage point onto the airframe of the aircraft (30), and (UAV) (70), and at the nearest distance from the point wherein the inner wire cable (51), via the hook splitter (51*b*), transfers the force through a minimum of (5), or more terminal stake eyes (51a), of the pretension devices (50), with Bowden cables connected thereto for delivery to the safety systems of the aircraft (30), and aerial vehicle (UAV) (70).

The proposed push-pull pretension device (50), with Bowden cable provides a reliable method of transmission of motion-force between a minimum of two fixed points of anchorage (52a), and (52b), within the aircraft (30), and aerial vehicle-(UAV) (70). Due to its flexibility, it can be routed beneath, above obstacles and around corners without intermediate links or pulleys and with operational reliability in the cable control. The cable control requires almost no maintenance as it does not transmit the noise and shocks and is quite flexible with a wide variety of parts for use with the inner cables of the core.

In the present invention, provision is made for the adjustment of the intensity of the cable by using an embedded rotating hollow screw, known as a "regulator", which elongates or shortens the housing of the cable relatively to its firm points of anchorage. Elongation or shortening of the connection is achieved by rotating the regulator that tightens or loosens the cable. Additionally, the design, and information concerning the mechanical construction of the core of the cables (wire ropes) made of stainless or galvanized steel, may be wire, rope, or cable. This construction has different properties, designed for special applications.

Thus, through the inner cable (51) made of stainless steel, of the Bowden cable pretension device (50), motion-force is transmitted in the form of a pull separately towards the respective safety system, which is redirected for further exploitation to the systems within the aircraft (30), and aerial vehicle-(UAV) (70).

The pretension device (50), with Bowden cable as depicted in (FIG. 1), installed within the aircraft (30), and aerial vehicle-(UAV) (70), for the purpose of providing safety is a true and representative way of connection in the basic operation of pulling-tightening for all remaining safety systems in different sections within aircraft (30), and aerial vehicle-(UAV) (70).

The two forward straps (20), and (21), of the parachute (40), towards the nose of the aircraft (30), and aerial vehicle-(UAV) (70), (FIGS. 2, and 3), with the connection to the forward sockets (46), on both the left and right side of the aircraft (30), and aerial vehicle-(UAV) (70), distribute the transferred force through the loops (35), (FIG. 1), to the two respective, main, initially first connected pretension devices with Bowden cables, and via the respective two inner cables (51), made of stainless or galvanized steel or wire, rope or cable etc., connected by means of the metal hook (27), onto the loops (35), (FIG. 1) distribute the transferred force to the lower terminal ends, the hook splitters (51b), on both the left and right sides of the aircraft (30), functioning as splitters for the connection and extension of numerous other connected terminal stake eyes (51a), of the pretension devices (50), with Bowden cables connected thereto so as to pull, tighten separately for each one the respective safety systems of the aircraft (30), and aerial vehicle-(UAV) (70).

We will hereinafter describe each respective safety system of the aircraft (30) separately, such as: 1). Pulling of the safety belt straps. 2). Anti-submerging seats, with the connected pretension devices (50).

Figure 8:
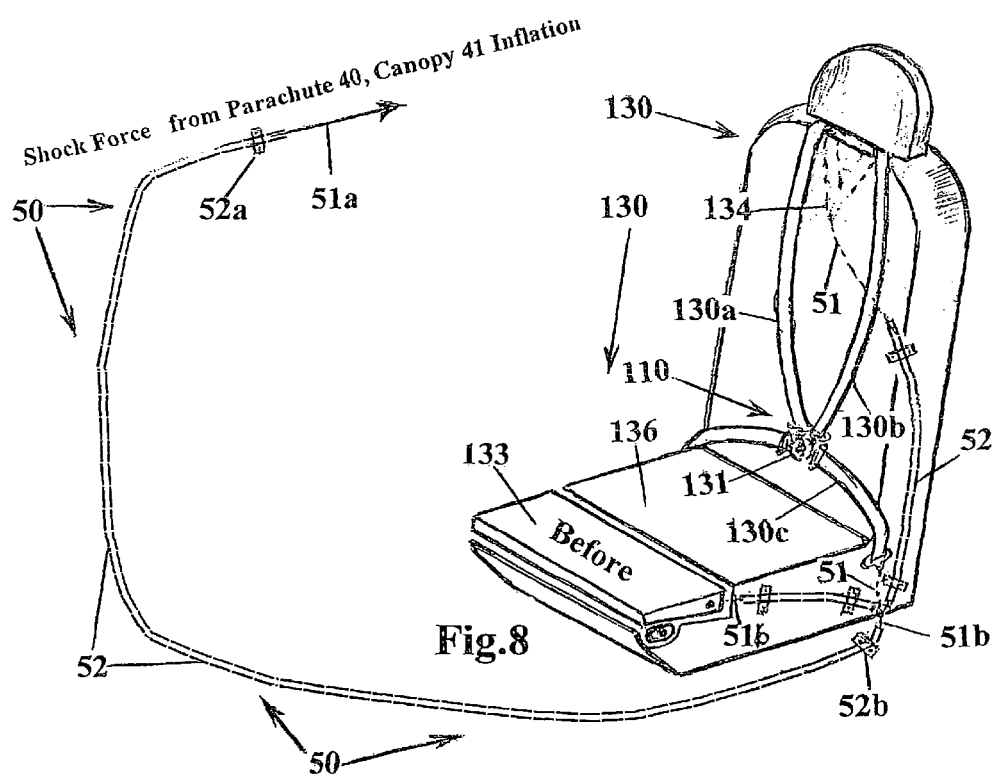
(FIG. 8), presents in perspective view the way of action of the pretension devices with Bowden cables connected to the safety belt and upon the seat.

1). Pulling of the safety belt straps: In an emergency situation the operation of the pretension device (50), with Bowden cable (FIG. 1), serves to stretch the straps (20), and (21), of the parachute (40), of the aircraft (30), by means of a dynamic pull of the loops (35), at the end of the straps and a simultaneous dynamic pull of the steel cables (51) connected thereto, so as to transmit the pull for the automatic tightening of the shoulder and waist straps of the safety belt, and securing and retaining the passengers' bodies in a rectilinear position (FIG. 8), by tightening them during an initial stage and releasing them in a second phase following the landing, acting with the tightening by means of the inner steel cable (51), of the torso with the upper shoulder straps of the safety belt wearer and the tightening of the waist strap of the safety belt wearer which is connected to a safety belt with three points of anchorage (FIG. 8). The further tightening of the torso with the seatbelt during deceleration, acceleration, will protect the wearers thereof and also make higher G-force levels more endurable. The proper initial position preceding the submerging during acceleration presupposes the support of the torso and the alignment of the vertebral column. The retaining system of a safety belt (110), at a point on the seat (130), comprises two shoulder straps (130a), and (130b), (FIG. 8), extending above the shoulders of the passenger, and at least one one waist strap (130c), which engulfs and holds the wearer's pelvis, whereby the waist strap (130c), may be connected to the shoulder straps (130a), and (130b), by means of a safety buckle. All straps are mounted indirectly onto the frame of the seat (130), of the aircraft (30).

The operation of the pretension device (50) with Bowden cable in an emergency situation may supplement the already existing retaining systems applicable to the safety belts of the seats for further mild and secure tightening for the protection of the torso from the energy resulting from the suddenly exerted force during deceleration, acceleration, wherein such a pretension device attached to an appropriate point of a safety belt worn by the passengers of the aircraft provides the capacity to tighten and hold the wearer in the right position so as to minimize any unfavorable effects, as it has been observed that the conventional harness straps are insufficient in fully tightening and holding the passenger in the proper position on the seat during an emergency situation. According to the abovementioned mode of connection and operation of the above pretension device (50), with Bowden cable, (FIG. 1, 8), with fixed anchorage thereof at the two ends of the plastic outer housing (52), onto two respective fixed points (52a), and (52b), results in the satisfactory tightening of the shoulder and waist straps of the safety belt of the wearer thereof and of the seat.

In particular, points (52a), and (52b), in (FIG. 1, 8), are the points of firm connection-anchorage of the pretension device (50), intended for the safety belt (110), onto the seat (130), (FIG. 8), wherein the pull of the inner steel cable (51), results in the mechanical force being transferred at the point wherein delivery thereof is desirable, namely at the upper terminal end (52b), at the extremity of the cable (51), which is connected directly by means of the two shoulder straps (130a), (130b), to an appropriate point (134) of their crossing at their upper end, as shown in (FIG. 8). Additionally, the point (52a), (52b), in (FIG. 8), towards the strap of the waist of the body called apron (130c), is the firm point of connection-anchorage of the pretension device (50), which is intended for the safety belt (110), onto the seat (130), and with the pull of the inner steel cable (51), the mechanical force is transferred to the point where its delivery is desirable, namely the upper terminal end (52b), and is connected directly to the strap of the waist of the body called apron (130c), at an appropriate point at the lower end thereof in a safety belt (110).

Figure 9:
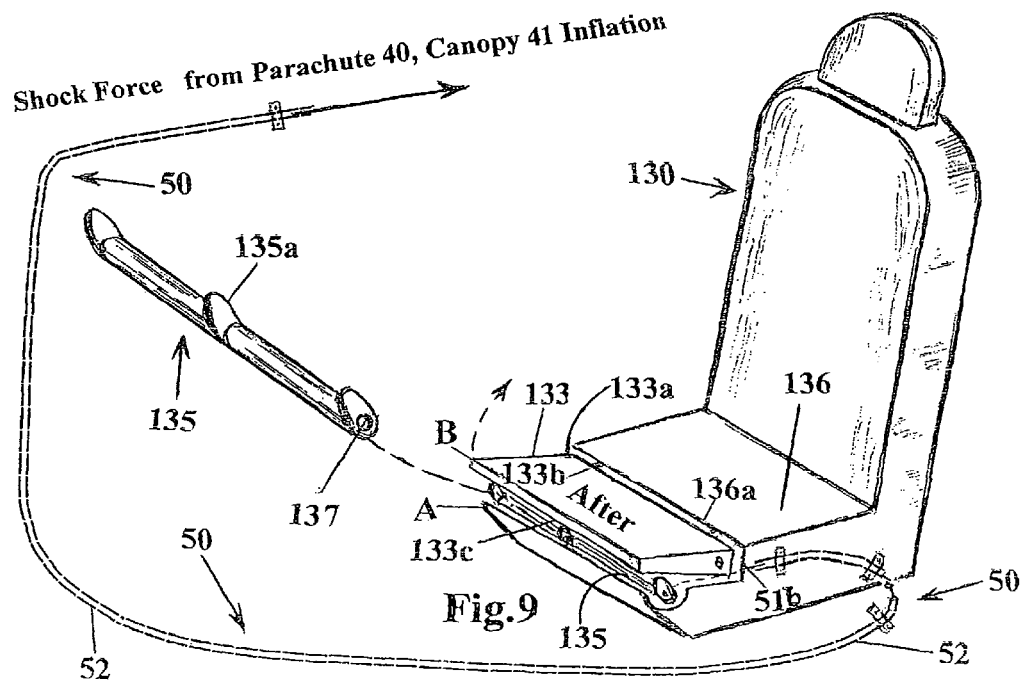
(FIG. 9), presents in perspective view the divided bottom of the aircraft seat with the way of action, and the Bowden cable pretension device connected at an appropriate point.

2). Anti-Submerging Seats: The operation of the pretension device (50), with Bowden cable (FIG. 1, 9) in an emergency situation during the stretching of the straps (20), and (21), of the parachute (40), of the aircraft (30), is intended for the dynamic pull of the loops (35), at the end of the straps and a simultaneous dynamic pull of the steel Bowden cable (51), of the pretension devices (50) connected thereto by means of the upper terminal end via the terminal stake eye (51a), and the transfer of the mechanical force to the point where delivery thereof is desirable at the extremity of the cable (51), which is connected directly so as to transmit the pull to the seats (130) as well, for the provision of anti-submerging with the automatic elevation of the forward section (133), of the bottom (136), of the seat (130), by means of a rotating rod (135) bearing cams mechanism (FIG. 9) The bottom of the seat (130), (FIG. 9), is divided into two main sections namely the fixed part (136), and the movable rotating forward section (133), for elevation. The elevation (FIGS. 2, and 9), of the forward section (133), of the bottom of the seat (130), is intended to retain the bodies of the passengers in a first stage of initiation of the retaining, and to release them in a second stage, following the landing. The movable forward section (133), with its side (133a), is connected to the forward side (136a), of the fixed section (136), by means of strong connectors (hinges) (133b), keeping it connected to the rest of the seat for the rotating movement and elevation thereof in the direction of (A-B). The elevation thereof is performed by means of a rotating cam rod (135), with a pull on appropriate points thereof (137), via the terminal stake eye (51b), at the extremity of the cable (51), for the semi-rotation thereof. The rotating rod (135), bears cams (135a), and is supported on its two ends (137), so as to perform a semi-rotation underneath the forward section (113), of the bottom of the seat (130). The rotating rod (135), with the semi-rotation thereof presents the elongated ends of the cams (135a), directly beneath and to the end (133c), and elevating the movable rotating forward section (133), of the bottom of the seat (130). The extremity of the cable (51), is wound around half the rod (135), at the two extreme points thereof (137), for the rotation of the rod (135), when it suffers a pull. Upon rotation of the rod (135), with the cams (135a), the movable rotating forward section (133), of the bottom of the seat (130), is elevated.

The movable rotating forward section (133), of the bottom of the seat (130), in an emergency situation and from the energy resulting from the suddenly exerted force during deceleration, acceleration, provides the capacity to elevate the thighs of the occupant thereof, wherein such an elevating forward section (133), of the bottom of the seat (130), fitted in an appropriate forward section of the bottom of the seat (130), whereon the passenger is sitting, provides the capacity to retain the body so that it does not slide beneath the waist strap of the safety belt nor submerge forwardly from the seat, as it has been observed that conventional seats are sometimes insufficient in fully retaining and properly positioning the passenger on the seat in an emergency situation.

We will hereinafter describe separately:

3). Rotation of the master switch to (Off). Rotation of the ignition switch to (Off). Rotation of the fuel switch to (Off). 4). Extension of the landing gear system. 5). Flaps extension. 6). Drainage of the liquid fuel, with the operation of the steel cable (51), of the pretension devices (50), intended for the transmission of the pull to each system which applies both to the aircraft (30), and aerial vehicle-(UAV) (70), with the connected pretension devices (50), in the respective safety systems thereof, such as:

3). The operation of the pretension device (50), with Bowden cable (FIG. 1, 11, 12), in an emergency situation during the stretching of the straps (20), and (21), of the parachute (40), of the aircraft (30), is intended for the dynamic pull of the loops (35), at the end of the straps and a simultaneous dynamic pull of the steel Bowden cable (51), of the pretension devices (50), connected thereto by means of the upper terminal end via the terminal stake eye (51a), and the transfer of the mechanical force to the desirable point at the extremity of the cable (51), via the hook splitter (51b), which is connected directly for the extension of numerous other connected terminal stake eyes (51a), of the steel cables (51), of the pretension devices (50), with Bowden cables so as to transfer the pull for the automatic engine shutdown, by means of:

Master switch (60). Ignition switch (63). Fuel switch (65), (FIG. 12). The extremity of the cable (51), of the pretension devices (50), with Bowden cables is connected directly at a specific point to the abovementioned switches (FIGS. 10, and 12), for the transmission of the pull intended for the automatic rotation of the master switch (60) key, to the (master switch-off) position, the automatic rotation of the ignition switch pin (63), to the (ignition switch-off) position, the automatic rotation of the fuel switch pin (65), to the (turn off fuel) position, or with the dynamic pull of the terminal (61a) of the ignition cable (61), (FIGS. 10, and 11), connected to the ignition coil (62), and with the purpose of performing the automatic detachment of the terminal (61a) by means of pulling the abovementioned ignition coil (62), from the socket (62a), and the disconnection of the power supply resulting in the automatic engine shutdown, and the stoppage of the rotation of the propeller of the aircraft (30), and aerial vehicle-(UAV), (70).

Figures 13, 14:
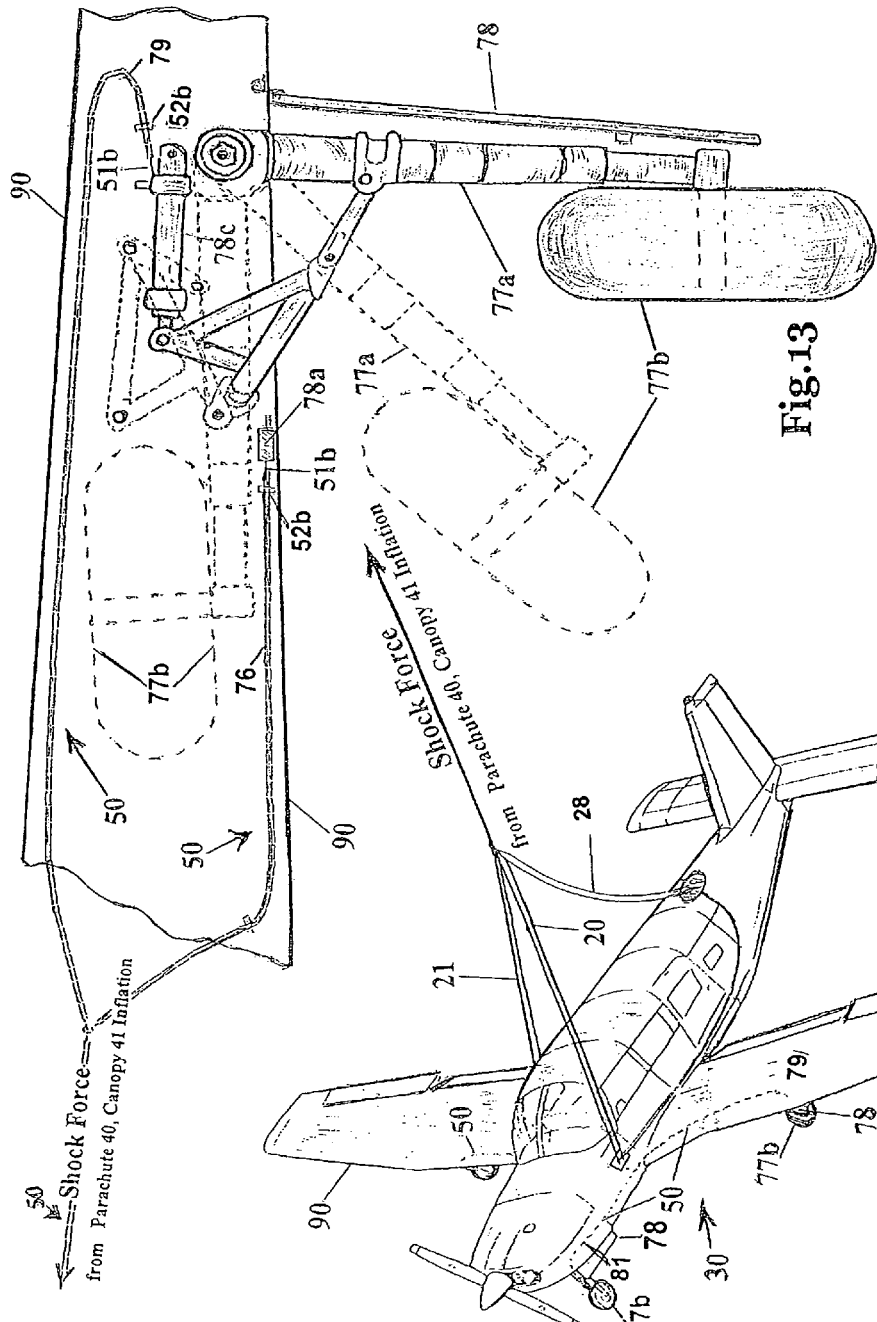
(FIG. 13), presents in perspective view the main landing system of the aircraft with the application of the pretension devices with Bowden cables.
(FIG. 14), presents in perspective view the aircraft with a configuration of the appropriate landing systems with the application of the pretension devices with Bowden cables.

4). The Landing Gear Extension System (77a), (FIG. 13, 14), also serves the purpose of absorbing the collision loads by means of the wheel legs-(oleo struts) (77a), wheel tires (77b), whilst landing on the ground. On the aircraft (30), and aerial vehicle-(UAV) (70), there are two basic mechanical landing gear extension systems, one on either side of the fuselage, and a separate mechanical system at the nose, all of which are retractable. The present invention refers more particularly to a main landing gear system (77a), comprising two first mechanical circuits, one on either side of the fuselage, each comprising the first circuit (76), for the actuation of the doors (78), in the main landing gear system, and a second circuit (79), for the actuation of the landing gear (77a), of the wheels (77b), and a separate mechanical system (81) at the nose for the nose wheel (77b), comprising a first circuit for the actuation of the doors (78), in the landing extension system, and a second circuit for the actuation of the landing system (77a), of the leg of the wheel (77b). The mechanical landing systems with the operation of the steel cables (51), of the pretension devices (50), with Bowden cables for the release and extension of the main landing gear system (77a), of the wheels (77b), and nose wheel (77b), are independent and override the conventional actuation system of the legs (77a), of the wheels (77b), of the aircraft (30), and aerial vehicle-(UAV) (70), and the manual extension/retraction system of the legs (77a), of the wheels (77b), of the aircraft (30).

The extension of the retracted main landing gear system (77a), of the wheels (77b), and for the nose wheel of the landing gear system (77a), of the wheel (77b), (FIG. 13, 14) in an emergency situation with the extremity of the steel cable (51), by means of the hook splitter (51b), which is directly connected for the extension of the other connected terminal stake eyes (51a), of the steel cables (51), of the pretension devices (50), with Bowden cables intended for the transmission of the pull for the automatic actuation by means of a violent drop of the doors (78), to the landing gear extension system for the release of the hydraulic operation of the doors system (78), such as uplocks (78a), NLG and MLG, a downward pull by means of spring pressure, cog release, etc. and for the actuation of the landing gear system (77a), by means of a violent drop of the legs (77a), of the wheels (77b), by means of transmission of the mechanical energy to the actuation mechanisms (78c), resulting in the release of the hydraulic operation fluids.

5). Full Flaps extension (92): The action of the pretension device (50), with Bowden cable in an emergency situation is intended to offer to the operation of a high-lift device resulting in the generation of extra lift by the wing (90), with the extension of the flaps (92), (FIG. 1,15,16,17,18) located in the middle and towards the fuselage (30a), section of the trailing edge of the wing (90), namely its rear portion altering the camber of the wing (90), when rotated downwards resulting in the increase in lift, thereby contributing during the descent of the aircraft (30), and aerial vehicle-(UAV) (70), with the parachute (40), to the decrease in the descent rate, with the extra lift generated. The diagram in (FIG. 18) refers to the lift coefficient of the wing (90), with the flaps extension (92), and without the extension. The extension of the high-lift device system of the flaps (92), is controlled during an emergency situation, once retracted, via the extremity of the steel cable (51), (FIG. 1, 16), by means of the hook splitter (51b), which is connected directly for the extension of the other connected terminal stake eyes (51a), of the steel cables (51), of the pretension devices (50), with Bowden cables intended to transmit the pull for the automatic actuation of the flaps (92), with the violent fall thereof to the full flaps position. The extension of the flaps system (92), (FIG. 15, 16, 17), refers indicatively to the simple flap type, yet the present invention is not limited only to this type of flaps. The simple flap type rotates onto the wing (90), and composes a part thereof, when in the up position. The high-lift device with the operation of the pretension device (50), with Bowden cable in an emergency situation overrides the standard flap actuating systems of the aircraft (30), and aerial vehicle-(UAV) (70), controlled from the cockpit by means of a spring switch allowing the extension or a mechanical manual lever allowing the extension of the flaps (92).

As shown in (FIG. 16), the pretension devices (50), with Bowden cable function as devices representing the mounting thereof for the connection between a minimum of two fixed points of mounting-anchorage, with anchorage by means of clamps of the outer plastic housing (52), wherein the case in point fixed points of mounting-anchorage are considered on the one hand the upper extreme point (52b), of the outer cable (52), of the pretension device (50), with Bowden cable and the lower extreme point (52a). The upper extreme point (52b) of the rail (52), (FIG. 16), of the pretension device (50), with Bowden cable is connected for the extension near the flaps (92), and is anchored fixedly onto the frame (90a), of the wing (90), particularly so as to provide the pulling thereof transmitted near the ends at the rotation points (92a, 92b), of the flap (92), on the wing (90), thus a minimum of two or more pretension devices (50), with Bowden cable are mounted for the even pull of the flap (92).

The lower extreme (52a), is anchored firmly onto the frame of the fuselage (30a), of the aircraft (30), and the anchorage points also apply to the aerial vehicle-(UAV) (70), and wherein inner wire cable (51), via the terminal end of the terminal stake eye (51a), receives the pulling force via the hook splitter (51b), transferred by the main pretension device (50), with Bowden cable connected to the metal snap hook (27), onto the loop (35), (FIG. 1), at the end of the strap (20), of the parachute (40). Then, the inner wire cable (51), with the upper terminal end of the hook splitter (51b), overriding the standard flaps actuation systems of the aircraft (30), and aerial vehicle-(UAV) (70); transfers the pulling force to the nearest distance near the rotation points (92a, 92b), on the flaps (92) system, wherein it is connected at an appropriate position and alters the camber of the wing (FIG. 15, 16, 17), with the pulling of the flaps when they are turned downwards.

6). Drainage and detachment and drop of the liquid fuel tanks (90b), (95): The operation of the pretension device (50), with Bowden cable in an emergency situation serves to drain the liquid fuel of the aircraft (30), and aerial vehicle-(UAV) (70), with a pull by means of the inner steel cable (51). The drainage of the liquid fuel serves to decrease the weight of the aircraft (30), and aerial vehicle-UAV (70), during its descent, to avoid explosion because of fire in mid-air, and to avoid explosion during collision with the ground. The operation of the pretension device (50), with Bowden cable (FIG. 1, 19, 20, 21, 22), when the aircraft (30), and aerial vehicle-(UAV) (70), are in a state of emergency, is intended for the dynamic pull of the loops at the end of the straps during the stretching of the straps of the parachute and the simultaneous dynamic pull of the steel cable (51), connected thereto by means of the upper terminal end via the terminal stake eye (51a), and the transfer of the mechanical force to the desirable point at the extremity of the cable (51), via the hook splitter (51b), which is connected directly for the extension of numerous other connected terminal stake eyes (51a), of the steel cables (51), of the pretension devices (50), with Bowden cables with a view to transmitting the pull for the drainage of the tanks (90b), (FIG. 20, 21, 22), or the detachment and drop of the liquid fuel tanks (95), (FIG. 20, 23). The tanks (90b), are located in either wing of the aircraft (30), and aerial vehicle-(UAV) (70), near the fuselage (30a), within the central wing (90). The drainage of the tanks (90b), is performed by means of tearing the covering of the wing made of metal, or plastic at the floor of the tank (90b), with the pulling of a section (90c), of the metal or plastic synthetic material of the covering of the tank floor by means of the steel cable (51), of the pretension device (50), with Bowden cable. In more detail, the drainage of the tank (90b), by means of tearing is performed within the wing (90), at the sealed section, of the central portion of the wing (90), between two ribs (90a). More specifically, the tearing of a section (90c), of the covering of the floor of the tank (90), made of metal, or plastic is achieved with the predefinition of the line (91), (FIG. 20, 21) and the surface for the tearing of the section (90c), on the metal or plastic at the floor of the tank (90b). The predefined line (91), is by compression of the metal, or plastic so that with the pulling of the end (90d), by means of the cable (51), via the hook splitter (51b), of the pretension device (50), with Bowden cable the tearing of the predefined section (90c), of the covering of the floor of the tank (90b), is achieved. In (FIG. 22), the floor of the tank (90b), is depicted during the tearing of the predefined section (90c), with the predefined line (91), by means of the cable (51), via the hook splitter (51b), and with the pulling of the end (90d), connected thereto. Circumferentially around the predefined section (90c), an added strut (91a), made of metal is interpolated and welded circumferentially around the section (90c), so that the predefined section (90c), does not bend with the pulling of the end (90d), and also to achieve the full tearing of the section (90c), until the ending point (90e), resulting in the escape and complete drainage of the liquid fuel tank.

The detachment and drop of the liquid fuel tank (95), mounted onto the fuselage (30a), (FIG. 20, 23), is proposed as an alternative solution with a pull by means of the cable (51), via the hook splitter (51b), of the pretension device (50), with Bowden cable, and the detachment in a predefined manner of the tubes (95b), and connectors of the tank (95), onto fuselage (30a), and by means of a pull of the door (95a), at the underneath portion of the fuselage of the aircraft (30), and aerial vehicle-(UAV) (70), by means of the cable (51), via the hook splitter (51), of the pretension device (50), with Bowden cable so as to open and facilitate its passage as it begins its downward movement so as to exit and fall to the ground. Its downward movement is achieved with a pull by means of the cable (51), via the hook splitter (51b), of the pretension device (50), with Bowden cables, of a mechanism (95c), at the outer upper section (95b), of the roof of the tank (95), and a mechanism (95c), mounted towards the ends thereof (95f, 95g). The mechanism (95c), comprises foils (95d), appropriately connected among them at points (95e), wherein with the pull at the point (95f), by means of the cable (51), via the hook splitter (51b), of the pretension device (50), with Bowden cables, the compression of the mechanism (95c) is achieved, between the roof of the tank (95), and the fuselage (30a), resulting in the downward push of the tank (95), so that it is displaced and thereby falls to the ground.

It should herein be noted that the description of the invention was made by reference to illustrative examples of application to which it is not limited. Thus, any alteration or modification regarding the described forms, sizes, configurations, materials and accessories of construction and assembly, techniques applied in the construction and operation of the elements of the invention, as long as they do not constitute a new inventive step and do not contribute to the technical development of the already known, are considered part of the scope and the aims of the present invention, as briefed in the following Claims:

The invention claimed is:

1. A ballistic parachute (40) for an aircraft (30) or for an unmanned aerial vehicle-(UAV) (70), comprising a pair of forward straps (20, 21) connected at forward sockets (46) provided proximally and on either side of the nose of the aircraft (30) or of the unmanned aerial vehicle-(UAV) (70) and a rearward strap (28) connected proximally to the tail of said aircraft (30) in the vicinity of a storage space of said parachute (40), the ballistic parachute being deployed and a canopy (41) thereof being inflated in an emergency situation, means of fixedly connecting said forward straps (20, 21) at said forward sockets (46), each of said forward straps (20, 21) comprising a folded extremity with a pair of folded sides that form a loop (35) with a frontal end and a rear end, transverse stitches (39, 39a) being provided at the rear end of said loop (35), an opening (36) being provided between said transverse stitches (39, 39a) at the rear end of said loop (35), an arm of said means of fixedly connecting said forward straps (20, 21) being confined within said opening (36) and an arm (27b) of a metallic snap hook (27) being confined at the frontal end of said loop (35), a main pretension device (50) of a Bowden cable being connected to said snap hook (27), said main pretension device (50) that is connected to said snap hook (27) comprising an inner cable (51) within a housing (52) being provided adjacently to said metallic snap hook (27), said housing (52) of said main pretension device (50) being fixedly mounted at points of anchorage (52a, 52b) of the frame of the aircraft (30) or of the UAV (70), a first end of said inner cable (51) of said main pretension device being provided with a terminal stake eye (51a) connected to a safety (27a) of said snap hook (27) and a second end of said inner cable (51) of said main pretension device being provided with a terminal stake eye (51b) adapted to function as a hook splitter, a plurality of terminal stake eyes (51a) of further pretension devices (50) of Bowden cables being connected to said terminal stake eye (51b) adapted to function as a hook splitter of said main pretension device (50) that is connected to said snap hook (27), each one of said further pretension devices (50) of Bowden cables being provided with a terminal stake eyes (51b) connected to a safety system of the aircraft (30) or (UAV) (70) and being adapted to transfer a pulling action therein with a scope of activation of said safety system during an emergency situation whereby, following deployment of the ballistic parachute (40) and inflating of said canopy (41) thereof, a dynamic shock is being exercised along said forward straps (20, 21) of the parachute (40), said dynamic shock resulting in tearing of said transverse stitches (39) and linear displacement of said metallic snap hooks (27) towards the rear end of said loop (35) of each one of said forward straps (20, 21) of the parachute (40), whereby a pulling action is being exerted onto said inner cable (51) of the main pretension device being connected to said safety (27a) of said snap hook (27), said pulling action being thereafter transferred to said further pretension devices (50) of Bowden cables thereby activating said safety systems of the aircraft (30) or (UAV) (70). said safety systems comprising any combination of the following:

a safety system adapted to perform shutdown of the engine of the aircraft (30) or (UAV) (70) through setting at an off condition of a master switch (60), of an ignition switch (63), of a fuel supply switch (65) and pulling of a terminal (61a) of an ignition cable of the engine of the aircraft (30) or of the (UAV) (70);

a safety system adapted to perform actuation of the doors and of the main landing system of the aircraft (30) or of the (UAV) (70);

a safety system adapted to perform full flaps extension (92) of the aircraft (30) or of the (UAV) (70);

a safety system adapted to perform drainage of liquid fuel tanks (90b) provided within the wings (90) and detachment and drop of a liquid fuel tank (95) within the fusealge of the aircraft (30) or of the (UAV) (70);

a safety system adapted to perform pulling and tightening of safety belts (110) provided in each one of a plurality of seats (130) of the aircraft (30); and a safety system adapted to provide an anti-submerging function to each one of the plurality of seats (130) of the aircraft (30).

2. A ballistic parachute (40) for an aircraft (30) or for an unmanned aerial vehicle-(UAV) (70) according to claim 1, wherein said means of fixedly connecting said forward straps (20, 21) at said forward sockets (46) are karabiners (26), a pair of mounting straps (23, 24) being provided for fixedly connecting each of said karabiners (26) to the frame of the aircraft (30) or of the unmanned aerial vehicle-(UAV) (70) and an arm (25) of said karabiners (26) being confined within said opening (36) between said transverse stitches (39, 39a) at the rear end of said loop (35) of each one of said forward straps (20, 21).

3. A ballistic parachute (40) for an aircraft (30) or for an unmanned aerial vehicle-(UAV) (70) according to claim 1, wherein said means of fixedly connecting said forward straps (20, 21) at said forward sockets (46) are metallic safety buckles (73) with an opening (71), a screw passing through the opening (71) being employed for fixedly connecting each one of said safety buckles (73) onto the frame of the aircraft (30) or of the unmanned aerial vehicle-(UAV) (70) and an arm (72) of said safety buckles (73) being confined within said opening (36) between said transverse stitches (39, 39a) at the rear end of said loop (35) of each one of said forward straps (20, 21).

4. A ballistic parachute (40) for an aircraft (30) or for an unmanned aerial vehicle-(UAV) (70) according to claim 1, wherein said means of fixedly connecting said forward straps (20, 21) at said forward sockets (46) are tubes (75) fixedly mounted onto the frame of the aircraft (30) or of the unmanned aerial vehicle-(UAV) (70), said tubes (75) being confined within said opening (36) between said transverse stitches (39, 39*a*) at the rear end of said loop (35) of each one of said forward straps (20, 21).

5. A ballistic parachute (40) for an aircraft (30) or unmanned aerial vehicle-(UAV) (70) according to claim 1, wherein said safety system adapted to perform shutdown of the engine of the aircraft (30) or (UAV) (70) through setting at an off condition of the master switch (60), of the ignition switch (63), of the fuel supply switch (65) and through pulling of the terminal (61*a*) of the ignition cable of the engine of the aircraft (30) or of the (UAV) (70) comprises a pretension device (50) of Bowden cable for the master switch (60), a pretension device (50) of Bowden cable for the ignition switch (63), a pretension device (50) of Bowden cable for the fuel supply switch (65) and a pretension device (50) of Bowden cable for pulling of the terminal (61*a*) of the ignition cable of the engine of the aircraft (30) or of the (UAV) (70), each one of said pretension devices (50) of Bowden cables being provided with a terminal stake eye (51*a*) being connected to said terminal stake eye (51*b*) adapted to function as a hook splitter of said main pretension device (50) that is connected to said snap hook (27), wherein the point of anchorage (52*a*) of the outer plastic housing (52) of said pretension devices (50) of the safety system adapted to perform shutdown of the engine of the aircraft (30) or (UAV) (70) is located onto the frame of the aircraft (30) or (UAV) (70), and said terminal stake eyes (51*b*) of said pretension devices (50) are connected directly onto said master switch (60), said ignition switch (63) said fuel supply switch (65) and said terminal (61*a*) of the ignition cable of the engine of the aircraft (30) or of the (UAV) (70) respectively, the second point of anchorage (52*b*) of the outer plastic housing (52) of said pretension devices (50) being located onto the frame of the aircraft (30) or (UAV) (70), adjacently to said master switch (60), said ignition switch (63), said fuel supply switch (65) and said terminal (61*a*) of the ignition cable (61) of the engine of the aircraft (30) or of the (UAV) (70) respectively, whereby, in response to the pulling action, resulting from the dynamic shock being exercised along said forward. straps (20, 21) of the parachute (40) during deployment thereof in an emergency situation, that is being transferred to said pretension devices (50) of said safety system adapted to perform shutdown of the engine of the aircraft (30) or (UAV) (70) in an emergency situation, said master switch (60), said ignition switch (63) and said fuel supply switch (65) are being set at an off condition and the terminal (61*a*) of the ignition cable (61) is detached from a socket (62*a*) of an ignition coil (62).

6. A ballistic parachute (40) for an aircraft (30) or unmanned aerial vehicle-(UAV) (70) according to claim 1, said aircraft (30) or unmanned aerial vehicle-(UAV) (70) comprising wheels (77*b*) mounted onto struts (77*a*) arranged within the wings (90) and a wheel (77*b*) with a mechanical actuation system (81) at the nose of said aircraft (30) or unmanned aerial vehicle-(UAV) (70), said struts (77*a*) being provided with hydraulic actuation mechanisms (78*c*) adapted to initiate rotation of said struts (77*a*) downwardly to extract the wheels (77*b*) through openings closed by doors (78), said doors (78) being actuated with actuation mechanisms (78*a*), wherein said safety system adapted to perform actuation of the doors and of the main landing system of the aircraft (30) or of the (UAV) (70) comprises pretension devices (50) of Bowden cables, each one of said pretension devices (50) of Bowden cables being provided with a terminal stake eye (51*a*) being connected to said terminal stake eye (51*b*) adapted to function as a hook splitter of said main pretension device (50) that is connected to said snap hook (27), the points of anchorage (52*a*, 52*b*) of the pretension devices (50) of said safety system adapted to perform actuation of the doors and of the main landing system of the aircraft (30) or of the (UAV) (70) being located onto the frame of the aircraft (30) or of the (UAV) (70), whereby, in response to the pulling action, resulting from the dynamic shock being exercised along said forward straps (20, 21) of the parachute (40) during deployment thereof in an emergency situation, that is being transferred to said pretension devices (50) of said safety system adapted to perform actuation of the doors and of the main landing system of the aircraft (30) or of the (UAV) (70) in an emergency situation, said doors (78) drop downwardly and said wheels (77*b*) on either side of the wings (90) and on the nose of the aircraft (30) are lowered to landing position.

7. A ballistic parachute (40) for an aircraft (30) or unmanned aerial vehicle-(UAV) (70) according to claim 1, wherein the aircraft (30) or (UAV) (70) comprises flaps (92) in the middle of the rear portion of a frame (90*a*) of each one of the wings (90) thereof, a trailing edge of said flaps (92) being oriented towards the fuselage of the aircraft (30) or (UAV) (70), extension of said flaps (92) providing an enhanced lift to the wings (90) during the descent of the aircraft (30) or (UAV) (70) with the parachute (40), said safety system adapted to perform full flaps extension (92) of the aircraft (30) or of the (UAV) (70) comprising a pretension device (50) of Bowden cable for said flaps (92) in each one of the wings (90) of the aircraft (30) or of the (UAV) (70), each one of said pretension devices (50) of Bowden cables being provided with a terminal stake eye (51*a*) being connected to said terminal stake eye (51*b*) adapted to function as a hook splitter of said main pretension device (50) that is connected to said snap hook (27), the points of anchorage (52*a*) of the pretension devices (50) being located onto the fuselage (30*a*) of the aircraft (30) or of the (UAV) (70) and the points of anchorage (52*b*) of the pretension devices (50) being located onto the frame (90*a*) of the wings (90) near the flaps (92), said inner cables (51) of the pretension devices (50) with Bowden cables having an end pivotally connected at points (92*a*, 92*b*) of said flaps (92), whereby said inner cables (51) of the pretension devices (50) with Bowden cables being adapted to rotate said flaps (92) at said points (92*a*, 92*b*) thereby altering the camber of the wings (90) of said aircraft (30) or (UAV) (70) and providing an enhanced lift during during descent of the aircraft (30) or (UAV) (70) in an emergency situation.

8. A ballistic parachute (40) for an aircraft (30) an unmanned aerial vehicle-(UAV) (70) according to claim 1, wherein a fuel tank (95) is mounted onto the fuselage of the aircraft (30) or (UAV) (70) and each wing (90) comprises a fuel tank section (90*b*) in between a pair of ribs (90*a*), said section (90*b*) covered with a covering (90*c*), said covering (90*c*) being delimited by a predetermined compressed and etched line (91), said safety system adapted to perform drainage of liquid fuel tanks (90*b*) provided within the wings (90) and detachment and drop of a liquid fuel tank (95) within the fuselage of the aircraft (30) or of the (UAV) (70) comprising a pretension device (50) of Bowden cable for each fuel tank section (90*b*) and a pretension device for the fuel tank (95) mounted onto the fuselage of the aircraft (30) or (UAV) (70), each one of said pretension devices (50) of Bowden cables being provided with a terminal stake eye (51*a*) being connected to said terminal stake eye (51*b*) adapted to function as a hook splitter of said main pretension device (50) that is connected to said snap hook (27), the points of anchorage (52*a*) of the pretension devices (50) being located onto the fuselage (30*a*) of the aircraft (30) or of the (UAV) (70) and the points of anchorage (52*b*) of the pretension devices (50) being located onto said fuel tank section (90*b*) and onto the fuselage for said fuel tank (95), said inner cables (51) of the pretension devices (50) with Bowden cables having an end connected at end points (90d) of said predetermined compressed and etched line (91), whereby, in response to the pulling action, resulting from the dynamic shock being exercised along said forward straps (20, 21) of the parachute (40) during deployment thereof in an emergency situation, that is being transferred to said pretension devices (50) of said safety system adapted to perform drainage of the liquid fuel tanks (90b) provided within the wings (90) and detachment and drop of the liquid fuel tank (95) within the fusealge of the aircraft (30) or of the (UAV) (70) in an emergency situation, said inner cables (51) of the pretension devices (50) with Bowden cables connected with said fuel tank sections (90b) perform tearing of said covering (90c) along said predetermined compressed and etched line (91) thereby allowing drainage of liquid fuel tanks (90b) and said inner cable (51) of the pretension device (50) with Bowden cable connected with said fuel tank (95) performs detachment of connecting tubes (95b) of said fuel tank (95) and opening of a bottom door (95a) thereby allow detachment and drop of the fuel tank (95) during descent of the aircraft (30) or (UAV) (70) in an emergency situation.

9. A ballistic parachute (40) for an aircraft (30) according to claim 1, wherein said aircraft comprises a plurality of seats (130) for an equivalent plurality of passengers, each one of said seats (130) being provided with a safety belt (110) comprising two shoulder straps (130a, 130b) extending above the shoulders of a passenger and at least one apron strap (130c) enclosing and retaining the pelvis of the passenger seated on one of said seats (130), a safety buckle (131) being employed to connect said apron strap (130c) to said shoulder straps (130a, 130b), wherein said safety system adapted to perform pulling and tightening of the safety belts (110) provided in each one of the plurality of seats (130) of the aircraft (30) comprises a first pretension device (50) of a Bowden cable for said shoulder straps (130a, 130b) and a second pretension device (50) of a Bowden cable for said apron strap (130c), wherein said first and second pretension devices (50) of Bowden cables are provided with a terminal stake eye (51a) being connected to said terminal stake eye (51b) adapted to function as a hook splitter of said main pretension device (50) that is connected to said snap hook (27), the point of anchorage (52a) of said first and of said second pretension device (50) being located at the bottom of the seat (130), whilst the point of anchorage (52b) of said first pretension device (50) of the shoulder straps (130a, 130b) is located onto a headrest of the seat (130) and the point of anchorage (52b) of said second pretension device (50) of the apron strap (130c) is located at the bottom of the seat (130), the terminal stake eye (51b) of said first pretension device (50) being connected at a point (134) of crossing of the shoulder straps (130a, 130b) and the terminal stake eye (51b) of said second pretension device (50) being connected at an end point of the apron strap (130c), wherein said first pretension device (50) of the shoulder straps (130a, 130b) and said second pretension device (50) of the apron strap (130c) are subject to tightening in response to the pulling action being exerted thereupon resulting from the dynamic shock being exercised along said forward straps (20, 21) of the parachute (40) during deployment thereof in an emergency situation, said first and second pretension devices (50) being released following landing of the aircraft (30).

10. A ballistic parachute (40) for an aircraft (30) according to claim 9, wherein each one of said seats (130) comprises a bottom (136) with a fixed portion (136) and a movable forward section (133), a rotating rod (135) bearing a cam mechanism being provided for rotation of the forward section (133), hinges (133b) being provided for connecting a rear side (133a) of said forward section (133) to a frontal side (136a) of the fixed section (136), wherein said safety system adapted to provide an anti-submerging function to each one of the plurality of seats (130) comprises a pretension device (50) of a Bowden cable, said pretension device (50) of Bowden cable being provided with a terminal stake eye (51a) being connected to said terminal stake eye (51b) adapted to function as a hook splitter of said main pretension device (50) that is connected to said snap hook (27), the points of anchorage (52a, 52b) of the pretension device (50) of said safety system adapted to provide an anti-submerging function to each one of the plurality of seats (130) being located at the bottom of the seat (130), and terminal stake eye (51b) of the pretension device (50) being connected at an end point (137) of said rotating rod (135), whereby, in response to the pulling action being exerted thereupon resulting from the dynamic shock being exercised along said forward straps (20, 21) of the parachute (40) during deployment thereof in an emergency situation, said rotating rod (135) is rotated and said movable forward section (133) is elevated by cams (135a) provided onto said rotating rod (135) thereby providing the anti-submerging function of retaining the body of a passenger seated onto the seat (130) averting sliding beneath the apron strap (130c) of the safety belt (110) and submerging forwardly from the seat (130), said pretension device (50) being released following landing of the aircraft (30).

* * * * *